US011876305B2

(12) United States Patent
Ito et al.

(10) Patent No.: US 11,876,305 B2
(45) Date of Patent: Jan. 16, 2024

(54) ELECTRONIC APPARATUS

(71) Applicant: Murata Manufacturing Co., Ltd., Nagaokakyo (JP)

(72) Inventors: Hiromitsu Ito, Nagaokakyo (JP); Masamichi Tamura, Nagaokakyo (JP); Tsuyoshi Mukai, Nagaokakyo (JP); Masayoshi Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 168 days.

(21) Appl. No.: 17/683,404

(22) Filed: Mar. 1, 2022

(65) Prior Publication Data

US 2022/0393354 A1 Dec. 8, 2022

Related U.S. Application Data

(63) Continuation of application No. PCT/JP2020/034074, filed on Sep. 9, 2020.

(30) Foreign Application Priority Data

Sep. 10, 2019 (JP) .................................. 2019-164548
Jan. 31, 2020 (JP) .................................. 2020-014412

(51) Int. Cl.
*H01Q 7/00* (2006.01)
*H01Q 1/24* (2006.01)
*H04B 5/00* (2006.01)

(52) U.S. Cl.
CPC ................. *H01Q 7/00* (2013.01); *H01Q 1/24* (2013.01); *H04B 5/0037* (2013.01)

(58) Field of Classification Search
CPC .......... H01Q 7/00; H01Q 1/24; H04B 5/0037; G06K 19/077; H02J 50/10
See application file for complete search history.

(56) References Cited

U.S. PATENT DOCUMENTS 6,137,447 A 10/2000 Saitoh et al.
2014/0168019 A1 6/2014 Hirobe et al.
(Continued)

FOREIGN PATENT DOCUMENTS

JP 09-98014 A 4/1997
JP 2013-120837 A 6/2013
(Continued)

OTHER PUBLICATIONS

Official Communication issued in International Patent Application No. PCT/JP2020/034074, dated Nov. 10, 2020.

*Primary Examiner* — David E Lotter
(74) *Attorney, Agent, or Firm* — Keating & Bennett, LLP

(57) ABSTRACT

An electronic apparatus includes a rectangular or substantially rectangular plate-shaped housing including a first side and a second side which are long sides and a third side and a fourth side which are short sides, and an antenna device. The antenna device includes a first coil including a first coil conductor and a second coil including a second coil conductor. A portion of the first coil overlaps with the second coil opening, a portion of the second coil overlaps with the first coil opening, a straight line connecting a center of gravity of the first coil opening and a center of gravity of the second coil opening intersects with the third side and the fourth side, and the center of gravity of the second coil opening is closer to the third side than the center of gravity of the first coil opening.

18 Claims, 34 Drawing Sheets

(56) References Cited

U.S. PATENT DOCUMENTS

| | | | |
|---|---|---|---|
| 2017/0005399 A1* | 1/2017 | Ito | H02J 50/402 |
| 2019/0385787 A1 | 12/2019 | Ichikawa | |
| 2019/0386388 A1* | 12/2019 | Yamamoto | H02J 50/005 |
| 2019/0386389 A1* | 12/2019 | Ichikawa | H01F 38/14 |

FOREIGN PATENT DOCUMENTS

| | | |
|---|---|---|
| JP | 2013-138404 A | 7/2013 |
| WO | 2019/163675 A1 | 8/2019 |

* cited by examiner

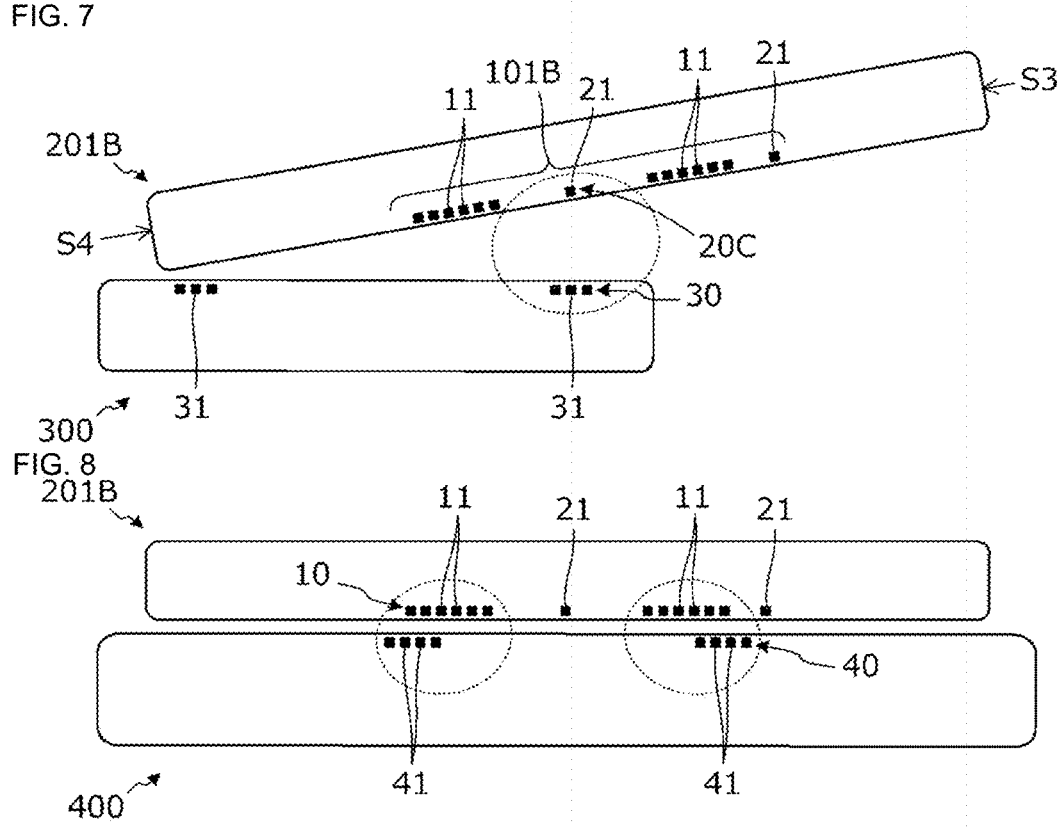

<BATTERY SIDE>

FIG. 35
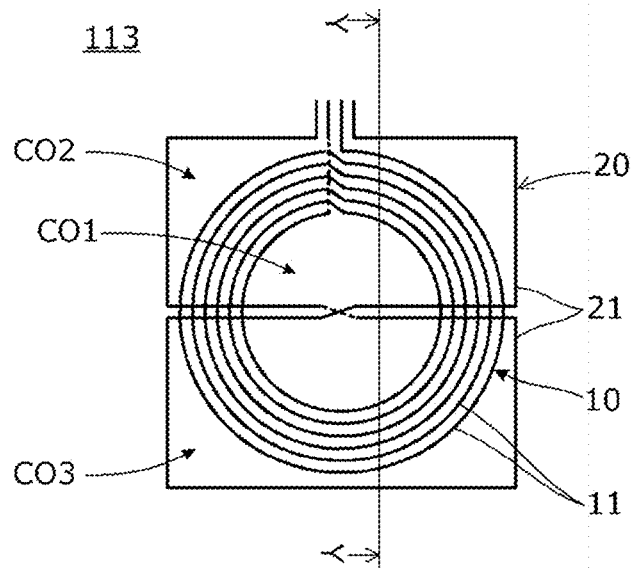
FIG. 36
FIG. 37
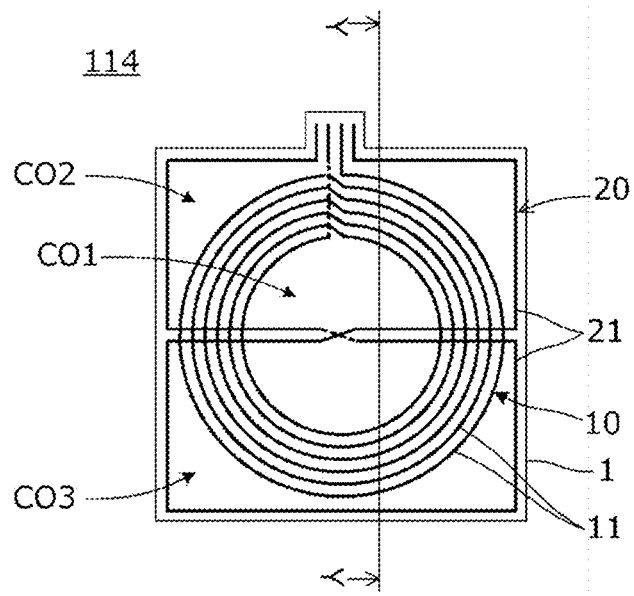
FIG. 38

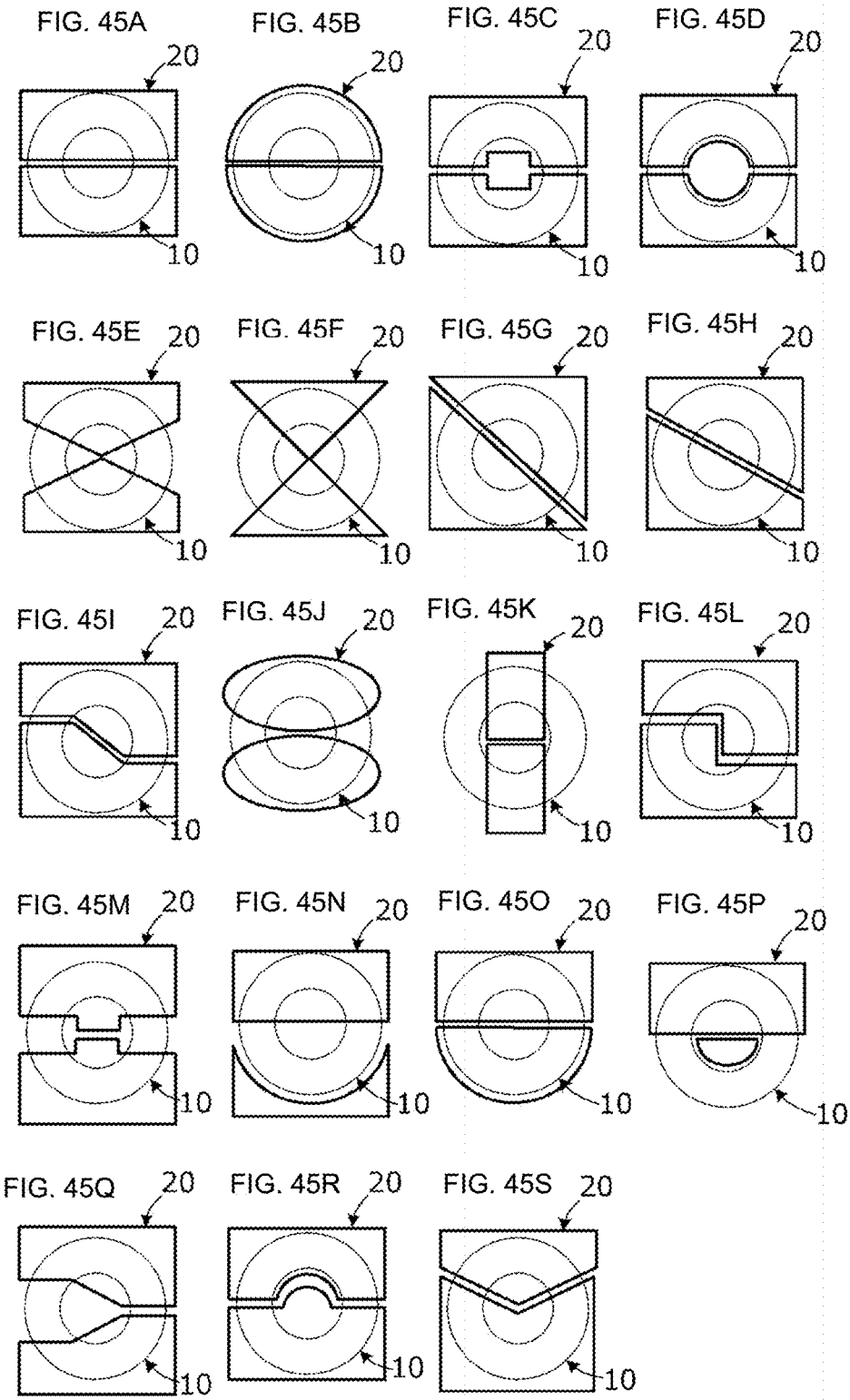

ELECTRONIC APPARATUS

CROSS REFERENCE TO RELATED APPLICATIONS

This application claims the benefit of priority to Japanese Patent Application No. 2019-164548 filed on Sep. 10, 2019 and Japanese Patent Application No. 2020-014412 filed on Jan. 31, 2020, and is a Continuation Application of PCT Application No. PCT/JP2020/034074 filed on Sep. 9, 2020. The entire contents of each application are hereby incorporated herein by reference.

BACKGROUND OF THE INVENTION

1. Field of the Invention

The present invention relates to an antenna device in which an antenna for use in a plurality of systems is provided, and an electronic apparatus including a housing enclosing the antenna device.

2. Description of the Related Art

Japanese Unexamined Patent Application Publication No. 2013-120837 describes a non-contact charging module in which a non-contact charging coil, a near field communication (NFC) antenna, and a magnetic sheet are provided in one module. This non-contact charging module includes the non-contact charging coil around which a conductive wire is wound, an NFC coil arranged so as to surround the non-contact charging coil, and the magnetic sheet that supports the non-contact charging coil and the NFC coil from the same direction.

In the antenna device having the configuration described in Japanese Unexamined Patent Application Publication No. 2013-120837, the coil for non-contact charging and the coil for an NFC antenna are coupled at four sides thereof, and unnecessary coupling is therefore strong. If the coil for the non-contact charging is smaller than the coil for the NFC antenna, the unnecessary coupling becomes weak, and performance of the non-contact charging is deteriorated. Further, since the directivity of the coil for the non-contact charging is substantially the same as the directivity of the coil for the NFC antenna, when a coil of one communication partner approaches, the coil of the other communication partner is strongly coupled to both of the coil for the non-contact charging and the coil for the NFC antenna, and the coil of the other communication partner is largely influenced.

The non-contact charging is performed by, by a user, placing an electronic apparatus on a charging base and leaving the electronic apparatus for a predetermined time. Accordingly, the non-contact charging coil of the electronic apparatus is generally arranged in a central portion of the electronic apparatus such that the non-contact charging coil faces a charging base-side coil provided at the center of the charging base.

On the other hand, if an NFC communicable area is located at the center of the electronic apparatus, a user's hand or finger interferes with a reader/writer. Further, the electronic apparatus itself interferes with the reader/writer depending on a shape of the reader/writer. It is therefore difficult to bring the NFC antenna close to an antenna of the reader/writer in such a state. In addition, the user often performs communication in a state in which an upper end portion of the electronic apparatus is inclined to the reader/writer while holding the electronic apparatus in the hand without paying attention to a position and directivity of the NFC coil in the electronic apparatus. For this reason, it is convenient for the electronic apparatus to have a characteristic of high sensitivity at an upper end portion or a position close to the upper end portion.

When the non-contact charging module described in Japanese Unexamined Patent Application Publication No. 2013-120837 is incorporated in the vicinity of the center of an electronic apparatus, NFC communication can be performed only in the vicinity of the center of the electronic apparatus in the above-described usage situation. The NFC communication therefore tends to fail when the user performs the NFC communication while holding the electronic apparatus.

SUMMARY OF THE INVENTION

Preferred embodiments of the present invention provide electronic apparatuses each including an antenna device in which unnecessary coupling between coils of the antenna device for use in a plurality of systems is reduced or antenna devices in each of which directivity of the antenna device used in the plurality of systems can be set to directions in accordance with the systems.

An electronic apparatus according to a preferred embodiment of the present invention includes a rectangular or substantially rectangular plate-shaped housing including a first side and a second side which are long sides and a third side and a fourth side which are short sides, and an antenna device included in the housing. The antenna device includes a first coil including a first coil conductor defining a first coil opening and a second coil including a second coil conductor defining a second coil opening, a portion of the first coil conductor overlaps with the second coil opening in plan view of the first coil opening, a portion of the second coil conductor overlaps with the first coil opening in plan view of the first coil opening, a center of gravity of the housing is within a formation region of the first coil in plan view of the first coil opening, and a first center of gravity of the second coil is closer to the third side than a center of gravity of the first coil in plan view of the first coil opening.

Preferred embodiments of the present invention each provide an electronic apparatus including an antenna device in which unnecessary coupling between coils of the antenna device for use in a plurality of systems is reduced or antenna devices in each of which a directivity of the antenna device for use in the plurality of systems can be set to directions in accordance with the systems.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a cross-sectional view illustrating a coupling state between the second coil 20 of the electronic apparatus 201B and the communication partner-side coil 30 of the communication partner apparatus 300.

FIG. 8 is a cross-sectional view illustrating a coupling state between the first coil 10 of the electronic apparatus 201B and the power transmission coil 40 of the power transmission apparatus 400.

FIG. 35 is a plan view of an antenna device 113 according to a thirteenth preferred embodiment of the present invention.

FIG. 36 is a cross-sectional view of a portion cut along a line Y-Y in FIG. 35.

FIG. 37 is a plan view of an antenna device 114 according to a fourteenth preferred embodiment of the present invention.

FIG. 38 is a cross-sectional view of a portion cut along a line Y-Y in FIG. 37.

FIGS. 45A to 45S are schematic plan views of other antenna devices according to the nineteenth preferred embodiment of the present invention.

DETAILED DESCRIPTION OF THE PREFERRED EMBODIMENTS

Figure 1A:
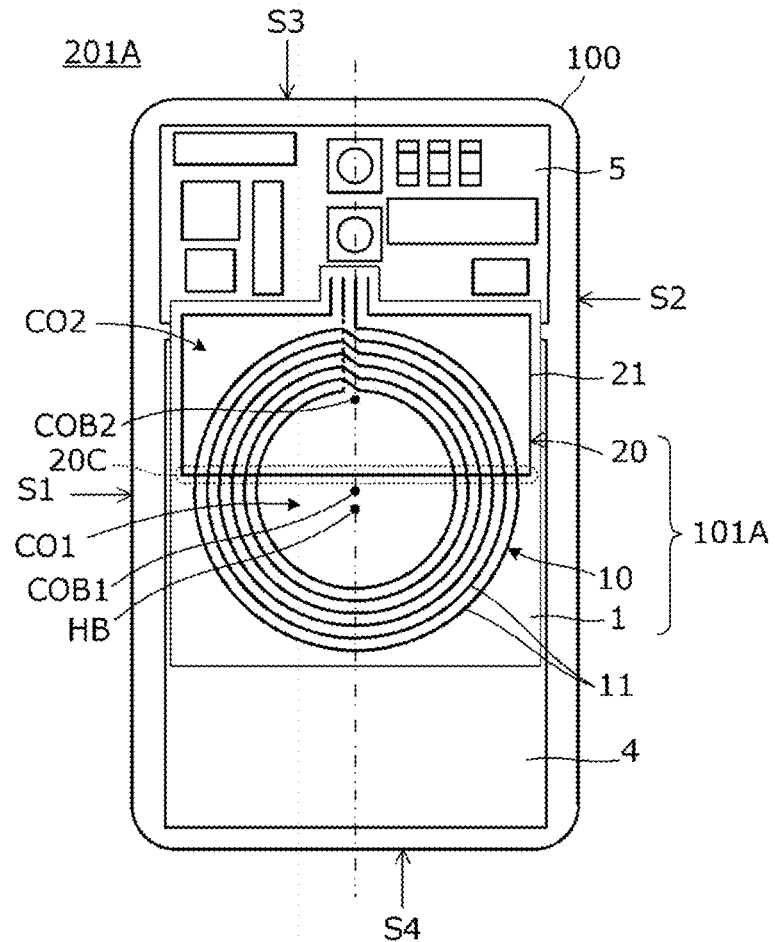
FIG. 1A is a plan view illustrating an electronic apparatus 201A according to a first preferred embodiment of the present invention.

Hereinafter, preferred embodiments of the present invention will be described with reference to the accompanying drawings. In the drawings, the same portions and elements are denoted by the same reference numerals. Although preferred embodiments are separately described for the convenience in consideration of explanation of main points or ease of understanding, partial replacement or combination of components described in different preferred embodiments can be made. In a second and subsequent preferred embodiments, description of matters common to those in a first preferred embodiment will be omitted, and only different points will be explained. In particular, the same or similar advantageous effects with similar configurations will not be repeated in each preferred embodiment.

An "antenna device" described in each preferred embodiment is an antenna device that is used in a "wireless transmission system". Here, the "wireless transmission system" is a system that performs wireless transmission by magnetic field coupling to a transmission partner (an antenna of an external apparatus). "Transmission" includes both transmission and reception of signals and transmission and reception of power. The "wireless transmission system" includes both a short-range wireless communication system and a wireless power feeding system. Since the antenna device performs the wireless transmission by the magnetic field coupling, the length of a current path of the antenna device, that is, a line length of a coil conductor, which will be described later, is sufficiently smaller than a wavelength λ at a frequency used for the wireless transmission, and is equal to or less than about λ/10, for example. Therefore, radiation efficiency of electromagnetic waves is low in a usage frequency band for the wireless transmission. Both ends of the coil conductor are connected to a feeding circuit, and a current with a uniform or substantially uniform magnitude flows through the current path of the antenna device, that is, through the coil conductor.

In addition, the "antenna device" described in each preferred embodiment can be applied to any of a transmission side and a reception side of a signal (or power). Even when the "antenna device" is described as an antenna that radiates magnetic flux, the antenna device is not limited to a generation source of the magnetic flux. The antenna device similarly acts when it receives (interlinks) magnetic flux generated by an antenna device on the transmission partner side, that is, even when a relationship between transmission and reception is reversed.

Near field communication (NFC) is an example of the short-range wireless communication used in the "antenna device" according to each preferred embodiment. A frequency band that is used in the short-range wireless communication is, for example, a high-frequency (HF) band, in particular, a 13.56 MHz band and a frequency band in the vicinity thereof.

Examples of the wireless power feeding system that is used in the "antenna device" according to each preferred embodiment include magnetic field coupling systems such as an electromagnetic induction system and a magnetic field resonance system. As a wireless power feeding standard of the electromagnetic induction system, for example, there is a standard "Qi (registered trademark)" developed by the Wireless Power Consortium (WPC). A frequency band that is used in the electromagnetic induction system is included in, for example, a range from equal to or higher than about 110 kHz to equal to or lower than about 205 kHz and a frequency band in the vicinity of the above-described range. As a wireless power feeding standard of the magnetic field resonance system, for example, there is a standard "AirFuel Resonant" developed by AirFuel (registered trademark) Alliance. A frequency band that is used in the magnetic field resonance system is, for example, a 6.78 MHz band or a 100 kHz band.

In each preferred embodiment, an "electronic apparatus" refers to an electronic apparatus such as a mobile phone terminal including a smartphone and a feature phone, for example.

First Preferred Embodiment

FIG. 1A is a plan view illustrating an electronic apparatus 201A according to a first preferred embodiment of the present invention. FIG. 1A illustrates a state where half of a housing 100 is detached to expose the inside of the electronic apparatus 201A. The electronic apparatus 201A includes a rectangular or substantially rectangular plate-shaped housing 100 including a first side S1 and a second side S2 which are long sides and a third side S3 and a fourth side S4 which are short sides, and an antenna device 101A included in the housing 100.

The electronic apparatus 201A includes a battery 4 and a printed circuit board 5 in the housing 100. The antenna device 101A is connected to the printed circuit board 5.

Figure 1B:
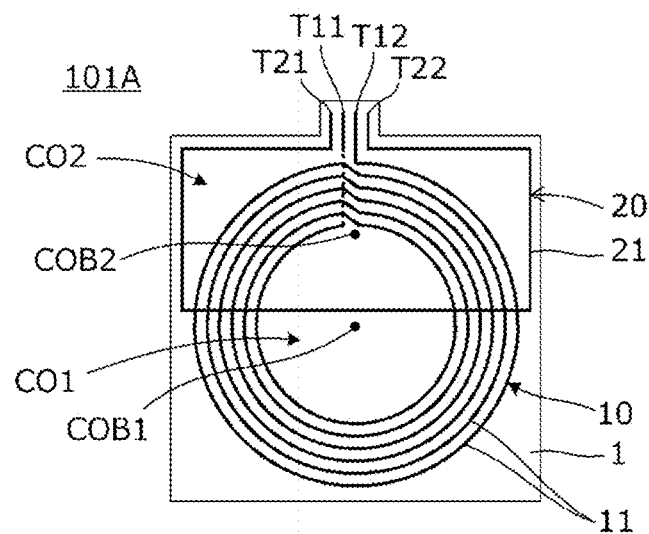
FIG. 1B is a plan view of an antenna device 101A included in the electronic apparatus 201A.

FIG. 1B is a plan view of an antenna device 101A included in the electronic apparatus 201A. The antenna device 101A includes a first coil 10 and a second coil 20 provided on an insulating base member 1. The first coil 10 includes a first coil conductor 11 being spirally wound a plurality of number of times around a first coil opening CO1. The second coil 20 includes a second coil conductor 21 that defines a rectangular or substantially rectangular second coil opening CO2. A portion where the first coil conductor 11 and the second coil conductor 21 intersect with each other in plan view is electrically insulated.

Figure 2A:
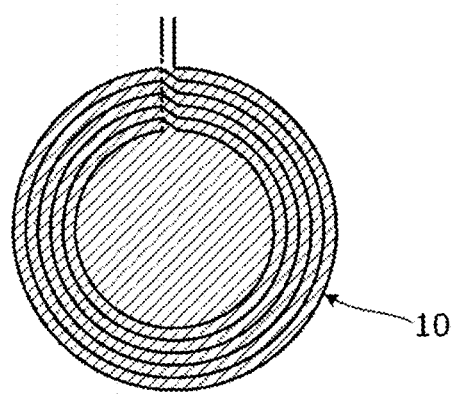
FIGS. 2A and 2B are views illustrating a relationship between a formation region of a first coil 10 and a first coil opening CO1 of the first coil 10.
Figure 2B:
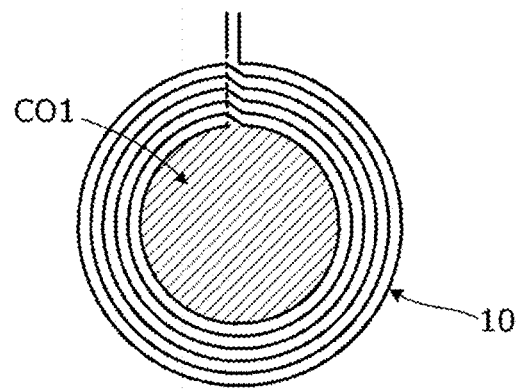

FIGS. 2A and 2B are views illustrating a relationship between a formation region of the first coil 10 and the first coil opening CO1 of the first coil 10. A hatched portion in FIG. 2A is the formation region of the first coil 10. A hatched portion in FIG. 2B is the first coil opening CO1 of the first coil 10.

The first coil 10 is used for power transmission by, for example, an electromagnetic induction system, and the second coil 20 is used for, for example, short-range wireless communication. For example, the outer diameter of the first coil 10 is equal to or larger than about 40 mm and equal to or smaller than about 50 mm, and the inner diameter of the first coil 10 is equal to or larger than about 15 mm and equal to or smaller than about 25 mm. The outer shape of the second coil 20 is rectangular or substantially rectangular, and the long sides thereof are equal to or larger than about 45 mm and equal to or smaller than about 55 mm and the short sides thereof are equal to or larger than about 15 mm and equal to or smaller than about 35 mm. In FIGS. 1A and 1B, although the number of turns of the first coil conductor 11 is illustrated to be small while giving priority to clarity of the drawings, the number of turns of the first coil conductor 11 is preferably about 10 turns to about 13 turns, for example.

Although the second coil conductor 21 includes one turn as an example in FIG. 1B, the second coil conductor 21 may be spirally wound a plurality of number of times around the second coil opening CO2.

When an eddy current flows through a conductor portion of the electronic apparatus or other components in the electronic apparatus to cause loss or a diamagnetic field in a state in which the antenna device is mounted on the electronic apparatus, antenna performance may be significantly deteriorated. In order to avoid this problem, a magnetic body sheet made of, for example, ferrite or nanocrystal may be provided on the electronic apparatus on the side where the antenna device is mounted.

Terminals T11 and T12 of the first coil 10 and terminals T21 and T22 of the second coil 20 illustrated in FIG. 1B are connected to the printed circuit board 5 illustrated in FIG. 1A. With this connection, the first coil 10 is connected to a power receiving circuit, and the second coil 20 is connected to a short-range wireless communication circuit.

A portion of the first coil 10 overlaps with the second coil opening CO2 in plan view of the first coil opening CO1 (plan view illustrated in FIG. 1B). Further, a portion of the second coil 20 overlaps with the first coil opening CO1 in plan view of the first coil opening CO1.

A center of gravity HB of the housing is located within the formation region of the first coil 10 in plan view of the first coil opening CO1. Further, the center of gravity HB of the housing is at or in a vicinity of a center of gravity COB1 of the first coil opening CO1 or is located within the first coil opening CO1 in plan view of the first coil opening CO1.

A center of gravity COB2 of the second coil opening CO2 is closer to the third side S3 than the center of gravity COB1 of the first coil opening CO1 in plan view of the first coil opening CO1.

In the first preferred embodiment, the center of gravity COB2 of the second coil opening CO2 corresponds to a "first center of gravity of a second coil." The center of gravity COB1 of the first coil opening CO1 corresponds to a "center of gravity of a first coil." The "center of gravity of the first coil" is the center of gravity of a region surrounded by a turn having a largest area of the first coil conductor surrounding the first coil opening. In addition, the "first center of gravity of the second coil" is the center of gravity of a region surrounded by a turn having a largest area of the second coil conductor surrounding the second coil opening. Further, the "center of gravity" indicates not a center of mass but a geometric center.

Moreover, a straight line (two dot dashed line illustrated in FIG. 1A) connecting the center of gravity COB1 of the first coil opening CO1 and the center of gravity COB2 of the second coil opening CO2 intersects with the third side S3 and the fourth side S4 in plan view of the first coil opening CO1.

The "center of gravity of the housing" indicates not the center of mass of the housing but a geometric center of the housing in plan view of the first coil opening CO1.

As illustrated in FIG. 1A, a coupling contribution portion 20C of the second coil 20, which contributes to coupling to a communication partner-side coil, overlaps with the formation region of the first coil 10 in plan view of the first coil opening CO1.

Figure 3A:
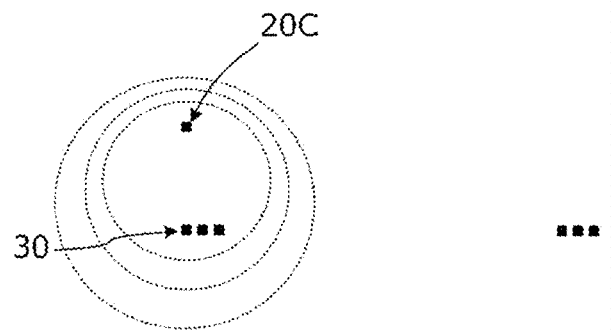
FIGS. 3A and 3B are cross-sectional views illustrating a coupling state between a coupling contribution portion 20C and a communication partner-side coil 30.
Figure 3B:
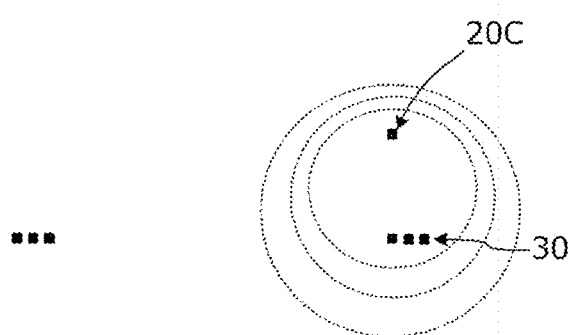

FIGS. 3A and 3B are cross-sectional views illustrating a coupling state between the coupling contribution portion 20C and a communication partner-side coil 30. The communication partner-side coil 30 is a spiral coil, and as illustrated in FIG. 3A or 3B, the second coil 20 and the communication partner-side coil 30 are strongly magnetic field-coupled at a position where magnetic flux circulating around the coupling contribution portion 20C of the second coil 20 interlinks a coil opening of the communication partner-side coil 30.

Figure 4:
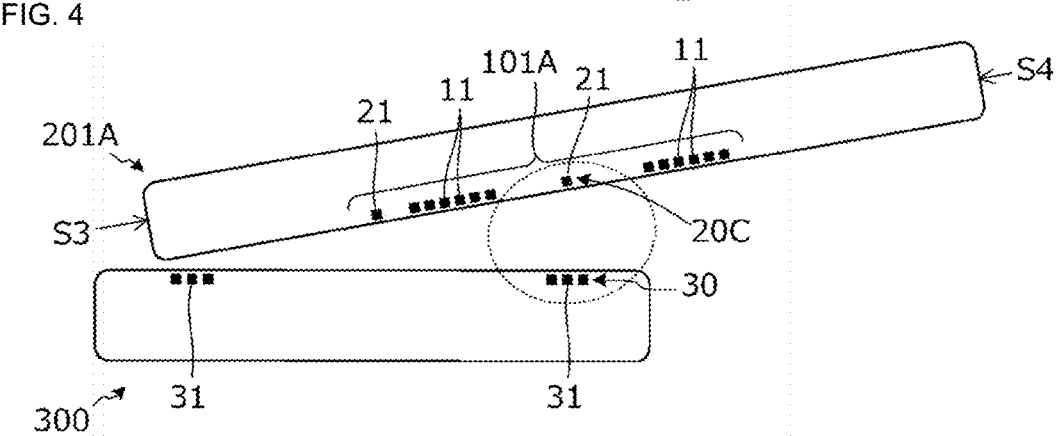
FIG. 4 is a cross-sectional view illustrating a coupling state between a second coil 20 of the electronic apparatus 201A and the communication partner-side coil 30 of a communication partner apparatus 300.

FIG. 4 is a cross-sectional view illustrating a coupling state between the second coil 20 of the electronic apparatus 201A and the communication partner-side coil 30 of a communication partner apparatus 300. A cross-sectional position of the electronic apparatus 201A in FIG. 4 is a position indicated by broken line in FIG. 1A. The communication partner-side coil 30 includes a communication partner-side coil conductor 31 having a circular or substantially circular spiral shape or a rectangular or substantially rectangular spiral shape.

The example illustrated in FIG. 4 indicates a positional relationship in which the third side S3, which is the front end of the electronic apparatus 201A, is closer to the communication partner apparatus 300 in comparison with a positional relationship in which the center of the electronic apparatus 201A overlaps with the center of the communication partner apparatus 300. In this state, in particular, the coupling contribution portion 20C of the second coil 20 of the electronic apparatus 201A is magnetically field-coupled with the communication partner-side coil 30 of the communication partner apparatus 300 as indicated by a dashed loop.

In FIG. 4, the fourth side S4 may be the front end of the electronic apparatus 201A. That is, a positional relationship in which the fourth side S4 of the electronic apparatus 201A is closer to the communication partner apparatus 300 than the positional relationship in which the center of the electronic apparatus 201A overlaps with the center of the communication partner apparatus 300 may be established. Even in this state, in particular, the second coil conductor 21 of the second coil 20 of the electronic apparatus 201A is magnetically field-coupled to the communication partner-side coil 30 of the communication partner apparatus 300.

Figure 5:
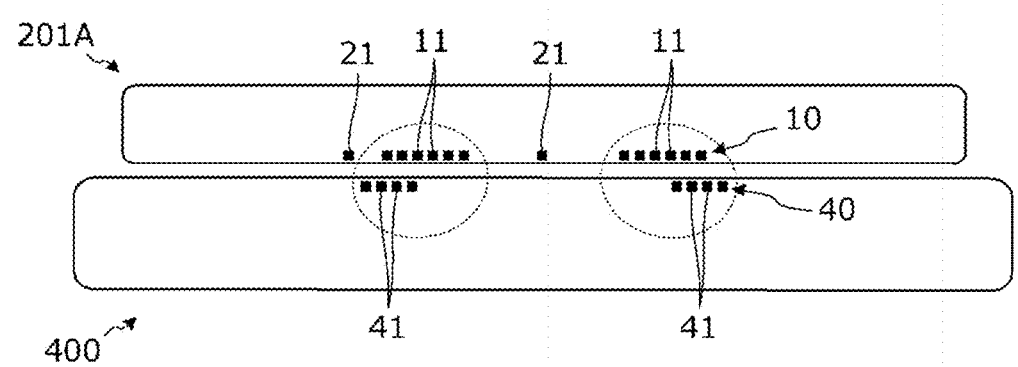
FIG. 5 is a cross-sectional view illustrating a coupling state between the first coil 10 of the electronic apparatus 201A and a power transmission coil 40 of a power transmission apparatus 400.

FIG. 5 is a cross-sectional view illustrating a coupling state between the first coil 10 of the electronic apparatus 201A and a power transmission coil 40 of a power transmission apparatus 400. A cross-sectional position of the electronic apparatus 201A in FIG. 5 is a position indicated by a broken line in FIG. 1A. The power transmission coil 40 includes a power transmission coil conductor 41 having a circular or substantially circular spiral shape or a rectangular or substantially rectangular spiral shape. In the example illustrated in FIG. 5, the electronic apparatus 201A is placed on the power transmission apparatus 400 with a positional relationship in which the center of the electronic apparatus 201A and the center of the power transmission apparatus 400 overlap or substantially overlap with each other. In this state, the first coil 10 of the electronic apparatus 201A is magnetically field-coupled to the power transmission coil 40 of the power transmission apparatus 400 as indicated by dashed loops.

Figure 6A:
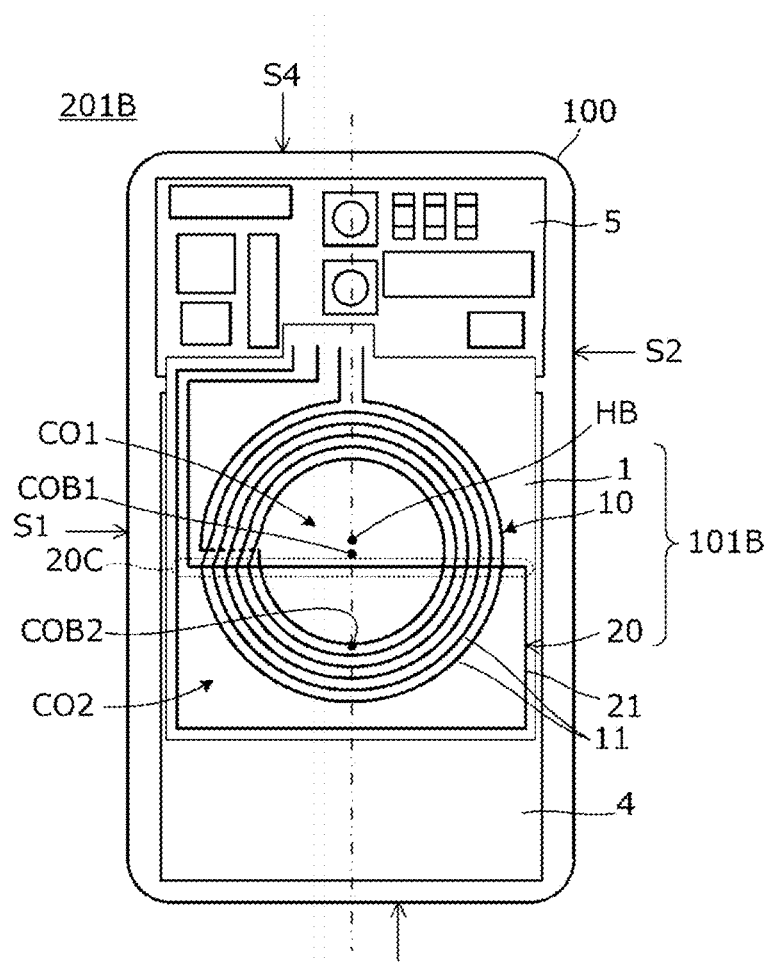
FIG. 6A is a plan view illustrating another electronic apparatus 201B according to the first preferred embodiment of the present invention.
Figure 6B:
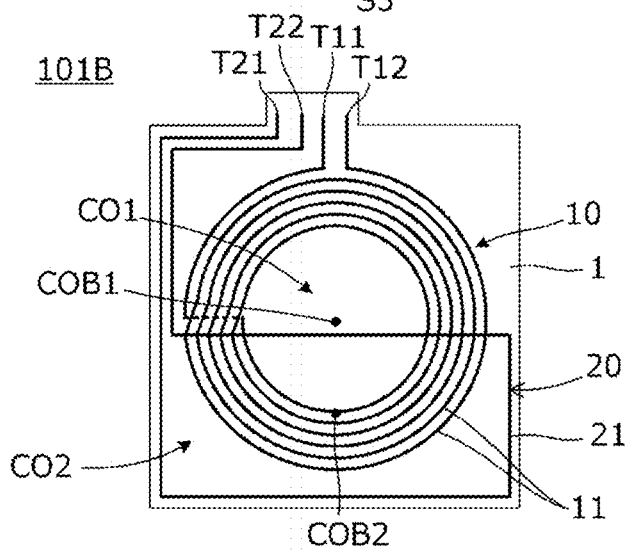
FIG. 6B is a plan view of an antenna device 101B included in the electronic apparatus 201B.

FIG. 6A is a plan view illustrating another electronic apparatus 201B according to the first preferred embodiment. FIG. 6A illustrates a state where half or approximately half of the housing 100 is detached to expose the inside of the electronic apparatus 201B. The electronic apparatus 201B includes the rectangular or substantially rectangular plate-shaped housing 100 including the first side S1 and the second side S2 which are long sides and the third side S3 and the fourth side S4 which are short sides, and an antenna device 101B included in the housing 100. In this example, the fourth side S4 is the front end of the electronic apparatus 201B. FIG. 6B is a plan view of an antenna device 101B included in the electronic apparatus 201B.

The antenna device 101A included in the electronic apparatus 201A illustrated in FIGS. 1A and 1B differs from the antenna device 101B included in the electronic apparatus 201B illustrated in FIGS. 6A and 6B in the configuration of the second coil.

The antenna device 101B includes the first coil 10 and the second coil 20 formed on the insulating base member 1. The first coil 10 includes the first coil conductor 11 having a shape of being spirally wound a plurality of number of times around the first coil opening CO1. The second coil 20 includes the second coil conductor 21 that forms the rectangular second coil opening CO2.

A portion of the first coil 10 overlaps with the second coil opening CO2 in plan view of the first coil opening CO1 (plan view illustrated in FIG. 6B). Further, a portion of the second coil 20 overlaps with the first coil opening CO1 in plan view of the first coil opening CO1.

The center of gravity HB of the housing is located within the formation region of the first coil 10 in plan view of the first coil opening CO1. Further, the center of gravity HB of the housing is at or in a vicinity of to the center of gravity COB1 of the first coil opening CO1 or is located within the first coil opening CO1 in plan view of the first coil opening CO1.

The center of gravity COB2 of the second coil opening CO2 is closer to the third side S3 than the center of gravity COB1 of the first coil opening CO1 in plan view of the first coil opening CO1.

In the first preferred embodiment, the center of gravity COB2 of the second coil opening CO2 corresponds to a "first center of gravity of a second coil." The center of gravity COB1 of the first coil opening CO1 corresponds to a "center of gravity of a first coil."

Further, a straight line (two dot dashed line illustrated in FIG. 6A) connecting the center of gravity COB1 of the first coil opening CO1 and the center of gravity COB2 of the second coil opening CO2 intersects with the third side S3 and the fourth side S4 in plan view of the first coil opening CO1.

FIG. 7 is a cross-sectional view illustrating a coupling state between the second coil 20 of the electronic apparatus 201B and the communication partner-side coil 30 of the communication partner apparatus 300. A cross-sectional position of the electronic apparatus 201B in FIG. 7 is a position indicated by a broken line in FIG. 6A. The example illustrated in FIG. 7 indicates a positional relationship in which the fourth side S4, which is the front end of the electronic apparatus 201B, is closer to the communication partner apparatus 300 than a positional relationship in which the center of the electronic apparatus 201B overlaps or substantially overlaps with the center of the communication partner apparatus 300. In this state, in particular, the coupling contribution portion 20C of the second coil 20 of the electronic apparatus 201B is magnetically field-coupled with the communication partner-side coil 30 of the communication partner apparatus 300 as indicated by a dashed loop.

In FIG. 7, the third side S3 may be the front end of the electronic apparatus 201B. That is, a positional relationship in which the third side S3 of the electronic apparatus 201B is closer to the communication partner apparatus 300 than the positional relationship in which the center of the electronic apparatus 201B overlaps or substantially overlaps with the center of the communication partner apparatus 300 may be established. Even in this state, in particular, the coupling contribution portion 20C of the second coil 20 of the electronic apparatus 201B is magnetically field-coupled with the communication partner-side coil 30 of the communication partner apparatus 300.

FIG. 8 is a cross-sectional view illustrating a coupling state between the first coil 10 of the electronic apparatus 201B and the power transmission coil 40 of the power transmission apparatus 400. A cross-sectional position of the electronic apparatus 201B in FIG. 8 is a position indicated by a broken line in FIG. 6A. In the example illustrated in FIG. 8, the electronic apparatus 201B is placed on the power transmission apparatus 400 with a positional relationship in which the center of the electronic apparatus 201B and the center of the power transmission apparatus 400 overlap or substantially overlap with each other. In this state, the first coil 10 of the electronic apparatus 201B is magnetically field-coupled with the power transmission coil 40 of the power transmission apparatus 400 as indicated by dashed loops.

Although the first preferred embodiment has described with the example in which the first coil 10 and the second coil 20 are provided on the base member 1, one or both of the first coil 10 and the second coil 20 may be an independent coil conductor without a base member. Further, a protective layer and an adhesive layer are not illustrated in the drawings. The same applies to other preferred embodiments described below.

With the configuration described above, the electronic apparatuses 201A and 201B described in the first preferred embodiment provide the following advantageous effects.

(a) A portion of the first coil 10 overlaps with the second coil opening CO2 and a portion of the second coil 20 overlaps with the first coil opening CO1 in plan view of the first coil opening CO1, that is, the first coil opening CO1 and the second coil opening CO2 are not coupled to each other over the entire or substantially the entire configuration. With this configuration, unnecessary coupling between the first coil 10 and the second coil 20 is weak. Further, a portion where the first coil opening CO1 and the second coil opening CO2 overlap with each other and a portion where the first coil opening CO1 and the second coil opening CO2 do not overlap with each other have opposite polarities in terms of a magnetic field generated by the second coil 20. With this configuration, the above-described unnecessary coupling can be reduced or prevented by adjusting the overlapping portion and non-overlapping portion. It is therefore not necessary to reduce the size of the second coil 20 for the short-range wireless communication in order to avoid the unnecessary coupling, and short-range wireless communication performance is not deteriorated. Moreover, the communication partner-side coil 30 is not strongly coupled to the first coil 10 for power reception, and an influence on the communication partner-side coil 30 is small.

(b) A user can place the electronic apparatus 201A or 201B on the center or approximate center of a placement surface of the power transmission apparatus to easily receive power (charge) in an unused state.

(c) In plan view of the first coil opening CO1, the straight line connecting the center of gravity COB1 of the first coil opening CO1 and the center of gravity COB2 of the second coil opening CO2 intersects with the third side S3 and the fourth side S4, and the center of gravity COB2 of the second coil opening CO2 is closer to the third side S3 than the center of gravity COB1 of the first coil opening CO1. With this configuration, a communicable area of the short-range wireless communication is located closer to the front end than the center of the electronic apparatus 201A, so that the short-range wireless communication is available without interference of the user's hand or finger with the communication partner apparatus 300 or interference of the electronic apparatus itself with a reader/writer.

(d) Since the user can perform communication in a state where an upper end portion of the electronic apparatus 201A or 201B (the third side S3 of the electronic apparatus 201A or the fourth side S4 of the electronic apparatus 201B) is inclined with respect to the reader/writer, it is convenient when the short-range wireless communication is used.

Second Preferred Embodiment

In a second preferred embodiment of the present invention, an electronic apparatus including a second coil including a plurality of coil openings will be exemplified.

Figure 9:
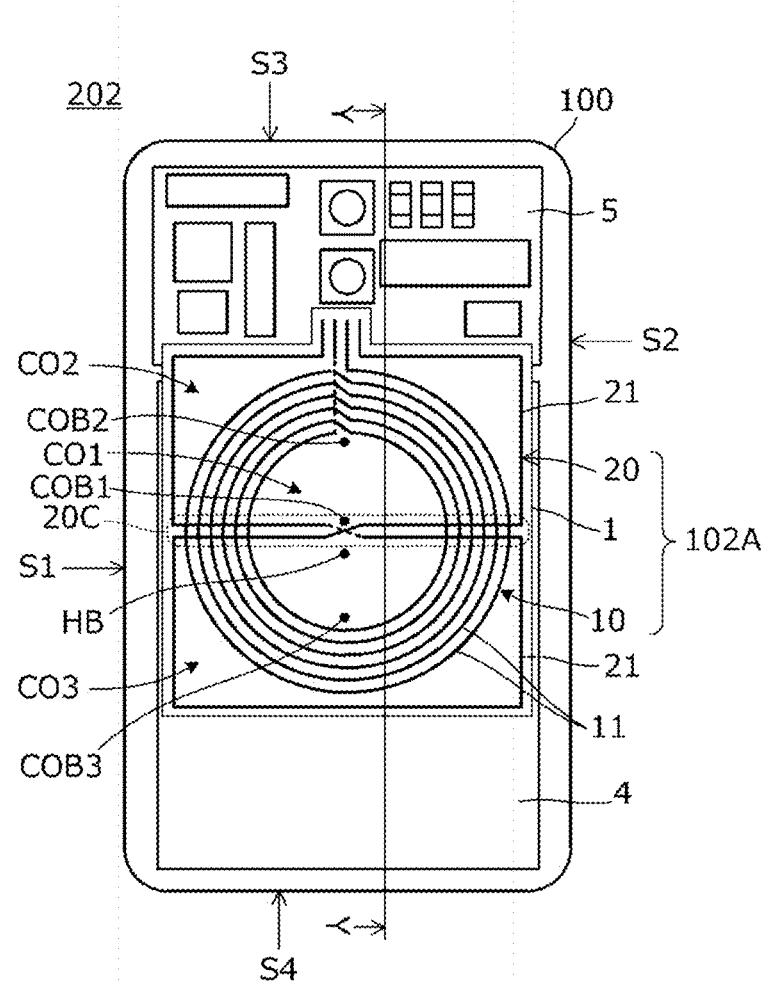
FIG. 9 is a plan view illustrating an electronic apparatus 202 according to a second preferred embodiment of the present invention.

FIG. 9 is a plan view illustrating an electronic apparatus 202 according to the second preferred embodiment. FIG. 9 illustrates a state where half or approximately half of the housing 100 is detached to expose the inside of the electronic apparatus 202. The electronic apparatus 202 includes the rectangular or substantially rectangular plate-shaped housing 100 including the first side S1 and the second side S2 which are long sides and the third side S3 and the fourth side S4 which are short sides, and an antenna device 102A included in the housing 100.

The electronic apparatus 202 includes the battery 4 and the printed circuit board 5 in the housing 100. The antenna device 102A is connected to the printed circuit board 5.

The antenna device 102A includes the first coil 10 and the second coil 20 provided on the insulating base member 1. The first coil 10 includes the first coil conductor 11 is spirally wound a plurality of number of times around the first coil opening CO1. The second coil 20 includes the second coil conductor 21 that defines the rectangular or substantially rectangular second coil opening CO2 and a rectangular or substantially rectangular third coil opening CO3. That is, the second coil 20 is a figure 8-shaped coil conductor pattern. Portions where the first coil conductor 11 and the second coil conductor 21 intersect with each other in plan view include an insulator layer interposed therebetween, and the first coil conductor 11 and the second coil conductor 21 are electrically insulated from each other.

A portion of the first coil 10 overlaps with the second coil opening CO2 and the third coil opening CO3 in plan view of the first coil opening CO1. Further, the third coil opening CO3 does not overlap with the second coil opening CO2 in plan view of the first coil opening CO1, and magnetic flux generated in the second coil opening CO2 and magnetic flux generated in the third coil opening CO3 by a current flowing through the second coil 20 have polarities opposite to each other.

The center of gravity HB of the housing is located within the formation region of the first coil 10 in plan view of the first coil opening CO1. Further, the center of gravity HB of the housing is at or in a vicinity of the center of gravity COB1 of the first coil opening CO1 or is located within the first coil opening CO1 in plan view of the first coil opening CO1.

The center of gravity COB2 of the second coil opening CO2 is closer to the third side S3 than the center of gravity COB1 of the first coil opening CO1 in plan view of the first coil opening CO1.

In the present preferred embodiment, the center of gravity COB2 of the second coil opening CO2 corresponds to the "first center of gravity of the second coil." The center of gravity COB1 of the first coil opening CO1 corresponds to a "center of gravity of a first coil." In the present preferred embodiment, a center of gravity COB3 of the third coil opening CO3 can be regarded as a second center of gravity of the second coil 20. Here, the "second center of gravity of the second coil" is the center of gravity of a region surrounded by a turn having a largest area of the second coil conductor surrounding the third coil opening.

A straight line connecting the center of gravity COB1 of the first coil opening CO1 and the center of gravity COB2 of the second coil opening CO2 intersects with the third side S3 and the fourth side S4 in plan view of the first coil opening CO1.

As illustrated in FIG. 9, the coupling contribution portion 20C of the second coil 20, which mainly contributes to coupling to a communication partner-side coil, overlaps with the formation region of the first coil 10 in plan view of the first coil opening CO1.

Figure 10:
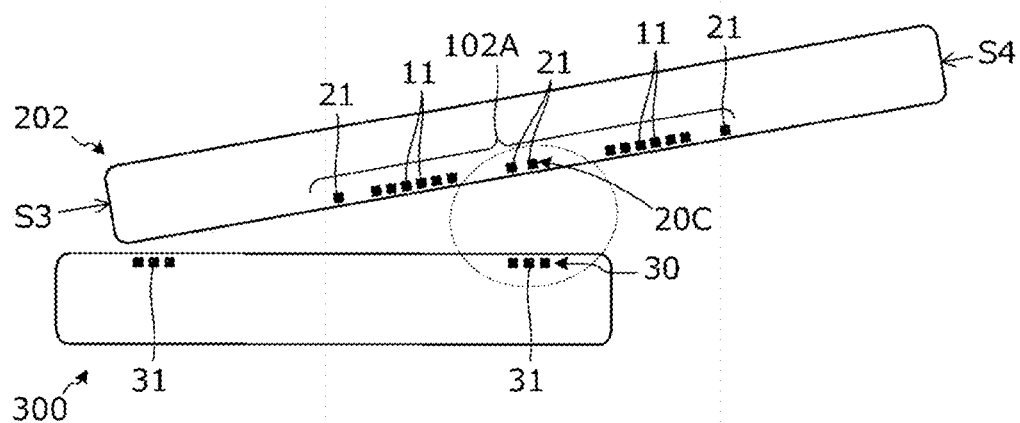
FIG. 10 is a cross-sectional view illustrating a coupling state between the second coil 20 of the electronic apparatus 202 and the communication partner-side coil 30 of the communication partner apparatus 300.

FIG. 10 is a cross-sectional view illustrating a coupling state between the second coil 20 of the electronic apparatus 202 and the communication partner-side coil 30 of the communication partner apparatus 300. A cross-sectional position of the electronic apparatus 202 in FIG. 10 is a position indicated by a line Y-Y in FIG. 9. The example illustrated in FIG. 10 indicates a positional relationship in which the third side S3, which is the front end of the electronic apparatus 202, is closer to the communication partner apparatus 300 than a positional relationship in which the center of the electronic apparatus 202 overlaps or substantially overlaps with the center of the communication partner apparatus 300. In this state, in particular, the coupling contribution portion 20C of the second coil 20 of the electronic apparatus 202 is magnetically field-coupled with the communication partner-side coil 30 of the communication partner apparatus 300 as indicated by a dashed loop.

Figure 11:
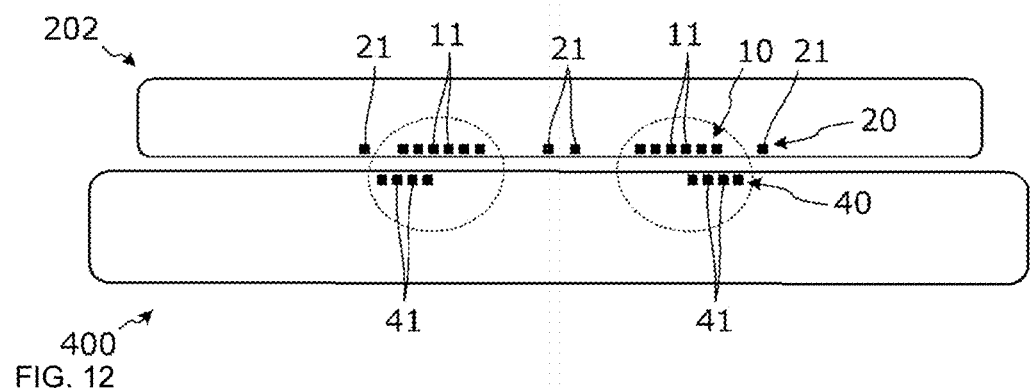
FIG. 11 is a cross-sectional view illustrating a coupling state between the first coil 10 of the electronic apparatus 202 and the power transmission coil 40 of the power transmission apparatus 400.

FIG. 11 is a cross-sectional view illustrating a coupling state between the first coil 10 of the electronic apparatus 202 and the power transmission coil 40 of the power transmission apparatus 400. A cross-sectional position of the electronic apparatus 202 in FIG. 11 is a position indicated by a line Y-Y in FIG. 9. In the example illustrated in FIG. 11, the electronic apparatus 202 is placed on the power transmission apparatus 400 with a positional relationship in which the center of the electronic apparatus 202 and the center of the power transmission apparatus 400 overlap or substantially overlap with each other. In this state, the first coil 10 of the electronic apparatus 202 is magnetically field-coupled with the power transmission coil 40 of the power transmission apparatus 400 as indicated by dashed loops. Although a coil opening of the power transmission coil 40 overlaps with the second coil opening CO2 and the third coil opening CO3, the polarity of coupling between the second coil opening CO2 of the second coil 20 and the coil opening of the power transmission coil 40 is opposite to the polarity of coupling between the third coil opening CO3 of the second coil 20 and the coil opening of the power transmission coil 40. The overlapping areas of the above-described two coil openings are equal or substantially equal to each other. Therefore, the second coil 20 and the power transmission coil 40 are substantially hardly coupled to each other, and a non-contact charging circuit is not affected by a short-range wireless communication circuit.

Figure 12:
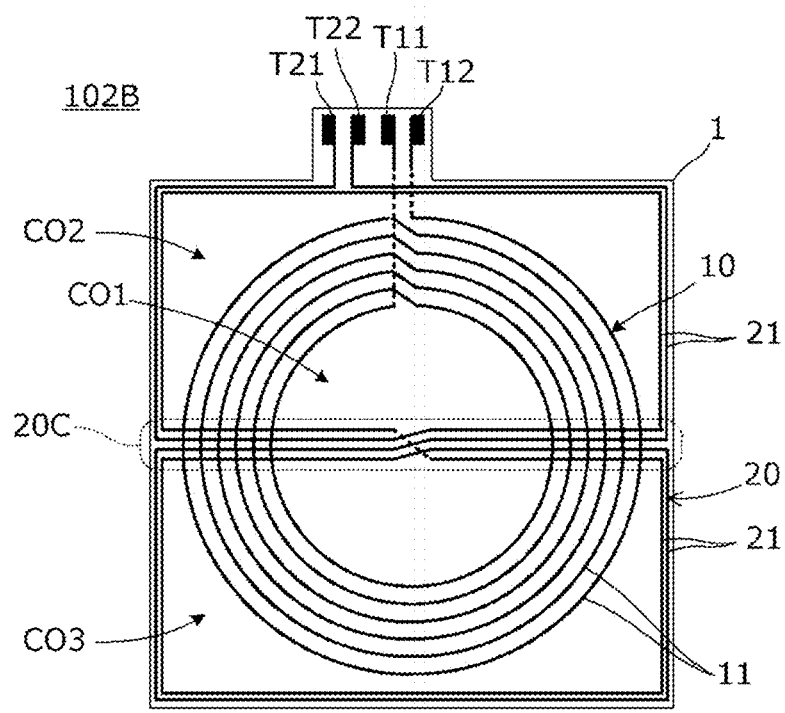
FIG. 12 is a plan view of an antenna device 102B in which the numbers of turns of coil conductors and terminal positions of the first coil 10 and the second coil 20 are different from those in the preferred embodiment illustrated in FIG. 9.

FIG. 12 is a plan view of an antenna device 102B in which the numbers of turns of coil conductors and terminal positions of the first coil 10 and the second coil 20 are different from those in the example illustrated in FIG. 9. The first coil 10 of the antenna device 102B includes the first coil conductor 11 including six turns. Further, the second coil opening CO2 of the second coil 20 includes the second coil conductor 21 including two turns, and the third coil opening CO3 of the second coil 20 includes the second coil conductor 21 including two turns.

As described above, the number of turns of the coil conductor of each of the first coil 10 and the second coil 20 can be determined as necessary. In addition, positions of the first coil terminals T11 and T12 and the second coil terminals T21 and T22 can be determined as necessary.

When a magnetic body is provided close to the first coil 10 and the second coil 20, the magnetic body may overlap with the entire first coil 10 and the entire second coil 20 in an orientation illustrated in FIG. 9, or the directivity may be changed by providing a portion overlapping with the magnetic body and a portion not overlapping with the magnetic body. Antenna devices including a magnetic body sheet will be described later as other preferred embodiments.

Third Preferred Embodiment

In a third preferred embodiment of the present invention, an electronic apparatus including an antenna device in which the configuration of a second coil is particularly different from that in the example described in the second preferred embodiment will be exemplified.

Figure 13:
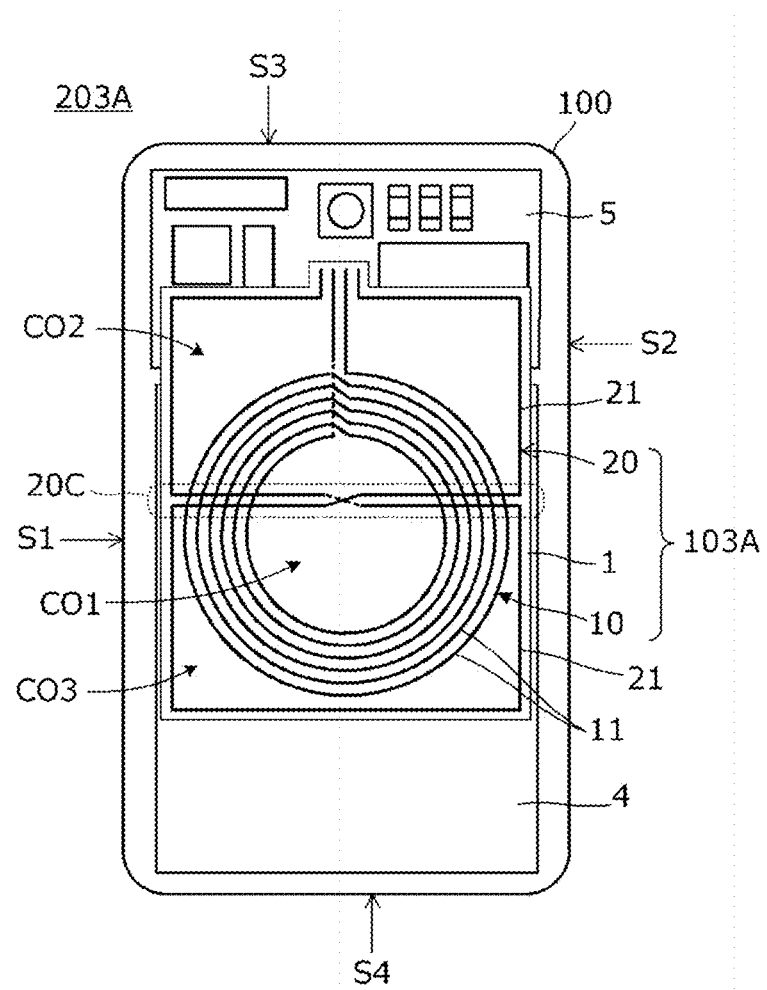
FIG. 13 is a plan view illustrating an electronic apparatus 203A according to a third preferred embodiment of the present invention.

FIG. 13 is a plan view illustrating an electronic apparatus 203A according to the third preferred embodiment. FIG. 13 illustrates a state where half or approximately of the housing 100 is detached to expose the inside of the electronic apparatus 203A. The electronic apparatus 203A includes the rectangular or substantially rectangular plate-shaped housing 100 including the first side S1 and the second side S2 which are long sides and the third side S3 and the fourth side S4 which are short sides, and an antenna device 103A included in the housing 100.

The electronic apparatus 203A includes the battery 4 and the printed circuit board 5 in the housing 100. The antenna device 103A is connected to the printed circuit board 5.

The antenna device 103A includes the first coil 10 and the second coil 20 provided on the insulating base member 1. The first coil 10 includes the first coil conductor 11 that is spirally wound a plurality of number of times around the first coil opening CO1. The second coil 20 includes the second coil conductor 21 including the rectangular or substantially rectangular second coil opening CO2 and the rectangular or substantially rectangular third coil opening CO3.

In plan view of the first coil opening CO1, a portion of the second coil 20 defining a boundary between the second coil opening CO2 and the third coil opening CO3 is located closer to the third side S3 than the center of gravity COB1 of the first coil opening CO1. That is, the coupling contribution portion 20C of the second coil 20, which contributes to coupling to the communication partner-side coil (the communication partner-side coil 30 illustrated in FIG. 10), is offset to the third side S3 side relative to the first coil 10.

Figure 14:
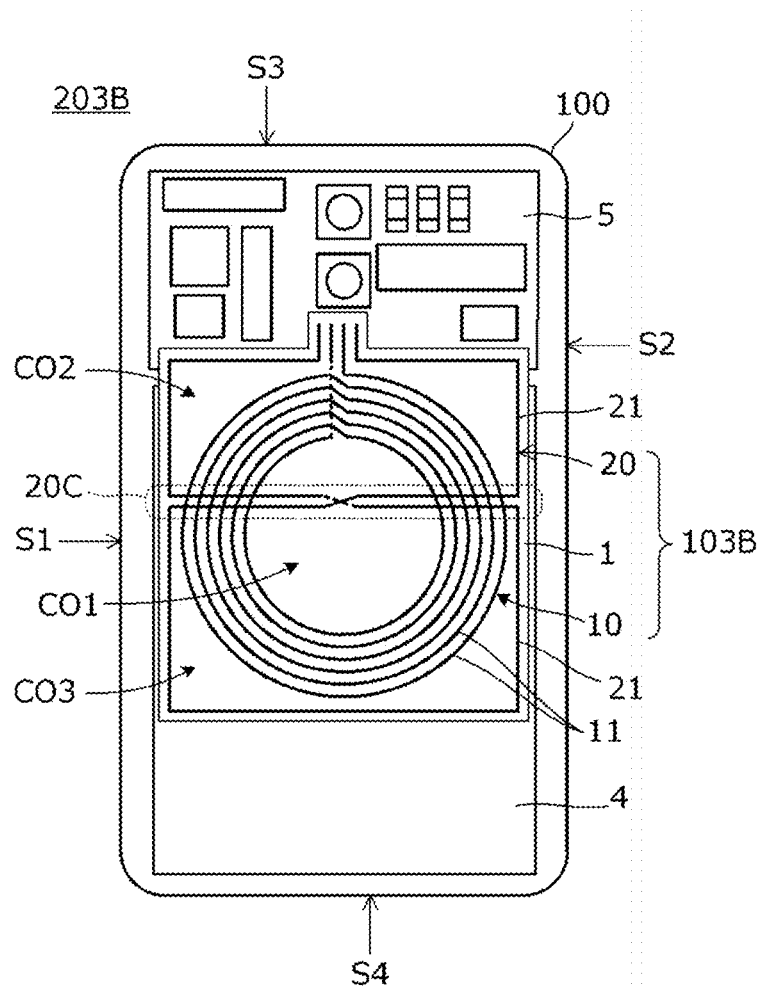
FIG. 14 is a plan view illustrating another electronic apparatus 203B according to the third preferred embodiment of the present invention.

FIG. 14 is a plan view of another electronic apparatus 203B according to the third preferred embodiment. In FIG. 14, the area of a portion of the second coil opening CO2, which overlaps with the first coil 10, is smaller than the area of the third coil opening CO3 overlapping with the first coil 10 in plan view of the first coil opening CO1. That is, the coupling contribution portion 20C of the second coil 20, which contributes to coupling to the communication partner-side coil (the communication partner-side coil 30 illustrated in FIG. 10), is offset to the third side S3 side relative to the first coil 10.

According to the present preferred embodiment, the second coil 20 for the short-range wireless communication is closer to the front end side (the third side S3 side) of the electronic apparatus 203A. Therefore, a peak of strength of coupling to the communication partner-side coil of the communication partner apparatus can be shifted to the front end side of the electronic apparatus 203A. In particular, the overall size of the antenna device 103B can be reduced in the example illustrated in FIG. 14.

The second coil 20 is coupled to the communication partner-side coil 30 as illustrated in FIGS. 3A and 3B. Therefore, even when the coupling contribution portion 20C is shifted to the fourth side S4 side, the communication peak is shifted to the front end side of the electronic apparatus 203B relative to the center of gravity of the first coil opening CO1 of the first coil 10, and the second coil opening CO2 is enlarged, thus expanding the directivity. Accordingly, such a configuration may also be used.

Unnecessary coupling between the first coil 10 and the second coil 20 may be weakened by making the number of turns of the coil conductor be different between the second coil opening CO2 and the third coil opening CO3.

Fourth Preferred Embodiment

In a fourth preferred embodiment of the present invention, an electronic apparatus including an antenna device, in particular, in which the configuration of a second coil is different from that in the example described in the second preferred embodiment will be exemplified.

Figure 15:
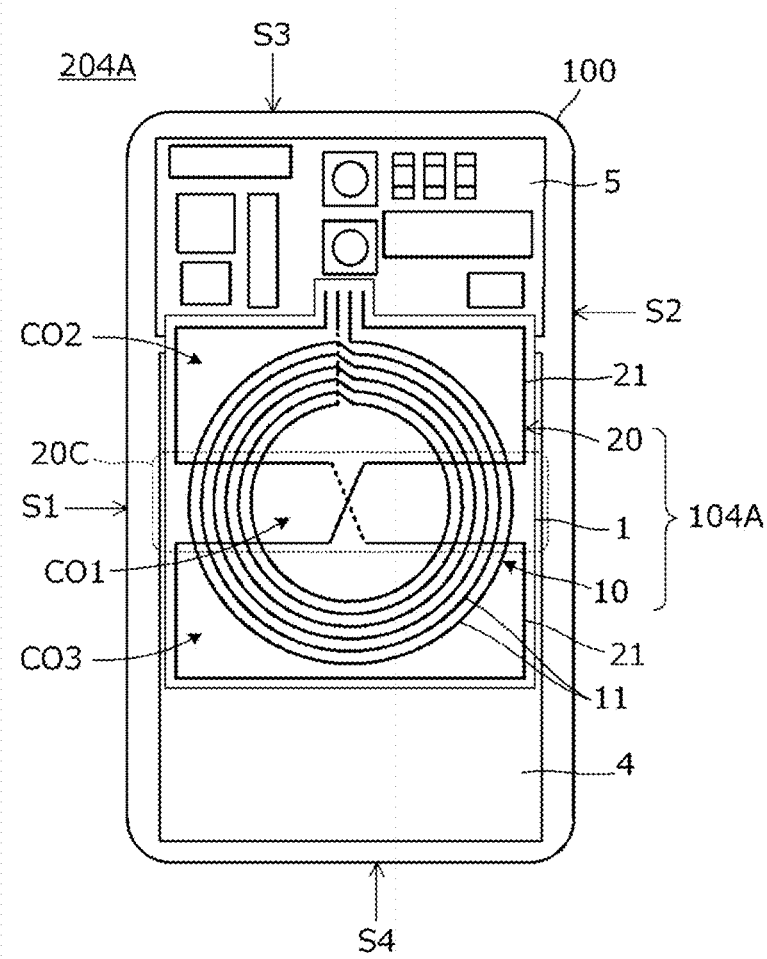
FIG. 15 is a plan view illustrating an electronic apparatus 204A according to a fourth preferred embodiment of the present invention.

FIG. 15 is a plan view illustrating an electronic apparatus 204A according to the fourth preferred embodiment. FIG. 15 illustrates a state where half or substantially half of the housing 100 is detached to expose the inside of the electronic apparatus 204A. The electronic apparatus 204A includes the rectangular or substantially rectangular plate-shaped housing 100 including the first side S1 and the second side S2 which are long sides and the third side S3 and the fourth side S4 which are short sides, and an antenna device 104A included in the housing 100.

The antenna device 104A includes the first coil 10 and the second coil 20 provided on the insulating base member 1. The first coil 10 includes the first coil conductor 11 that is spirally wound a plurality of number of times around the first coil opening CO1. The second coil 20 includes the second coil conductor 21 that includes the rectangular or substantially rectangular second coil opening CO2 and the rectangular or substantially rectangular third coil opening CO3.

In the antenna device 104A illustrated in FIG. 15, an interval between the second coil opening CO2 and the third coil opening CO3 is larger than that in the example illustrated in FIG. 9. In the antenna device 104A, the first coil opening CO1 includes a portion that does not overlap with any of the second coil conductor 21, the second coil opening CO2, and the third coil opening CO3 in plan view of the first coil opening CO1. The width of the coupling contribution portion 20C of the second coil is therefore larger than that in the example illustrated in FIG. 9.

Figure 16A:
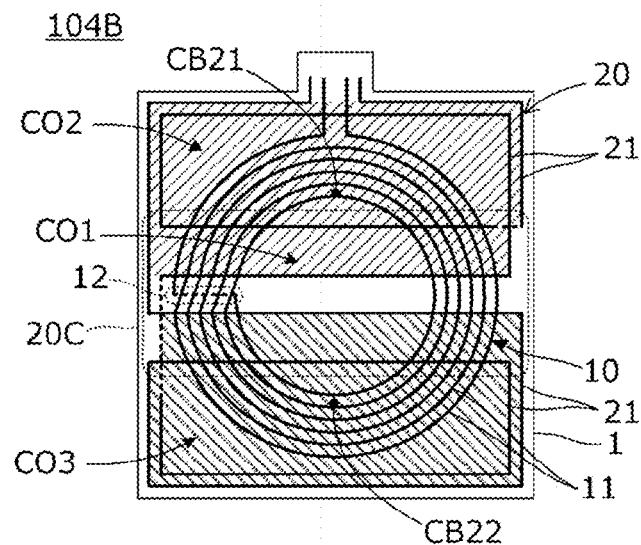
FIGS. 16A and 16B are plan views of another antenna device 104B according to the fourth preferred embodiment of the present invention.
Figure 16B:
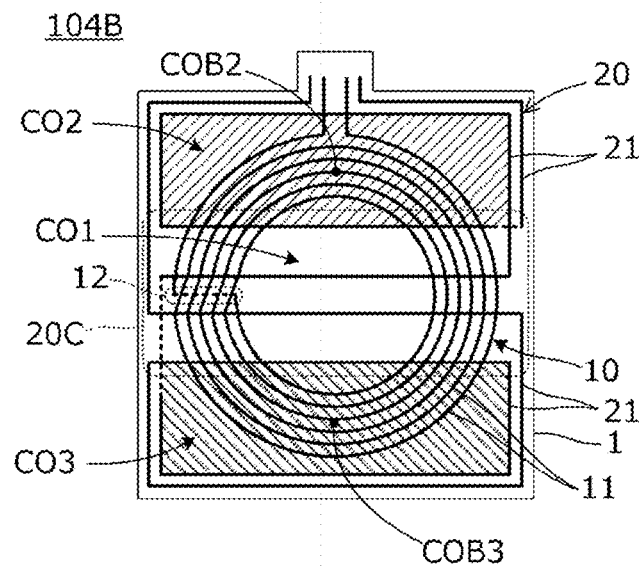

FIGS. 16A and 16B are plan views of another antenna device 104B according to the fourth preferred embodiment. In the antenna device 104B, each of a portion defining the second coil opening CO2 and a portion defining the third coil opening CO3 in the second coil conductor 21 includes two turns.

In FIG. 16A, the center of gravity of an upper region of two hatched regions is a first center of gravity CB21 of the second coil 20, and the center of gravity of a lower region thereof is a second center of gravity CB22 of the second coil 20. Further, in FIG. 16B, an upper region of two hatched regions is the second coil opening CO2, and the center of gravity thereof is the center of gravity COB2 of the second coil opening CO2. In FIG. 16B, a lower region of the two hatched regions is the third coil opening CO3, and the center of gravity thereof is the center of gravity COB3 of the third coil opening CO3.

Figure 17:
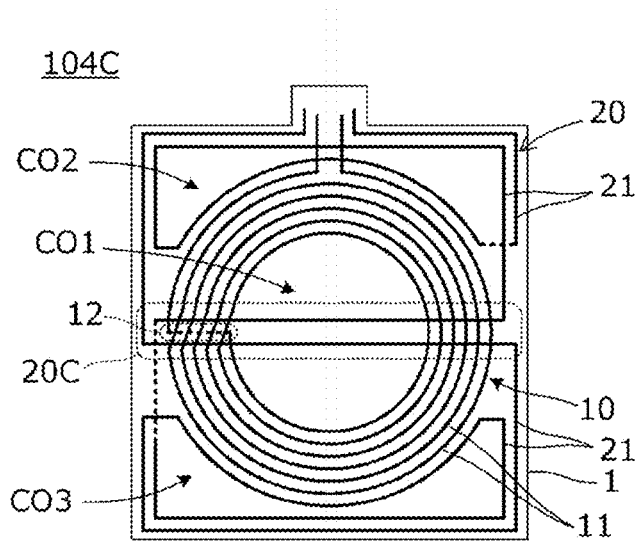
FIG. 17 is a plan view of another antenna device 104C according to the fourth preferred embodiment of the present invention.

FIG. 17 is a plan view of another antenna device 104C according to the fourth preferred embodiment. In this antenna device 104C as well, each of a portion defining the second coil opening CO2 and a portion defining the third coil opening CO3 in the second coil conductor 21 includes two turns. However, two upper and lower coil conductors among four coil conductors extending in the left and right direction in the orientation illustrated in FIG. 17 are in outer side portions of the first coil 10.

According to the present preferred embodiment, short-range wireless communication can be performed with directivity different from that in the examples described above. In particular, in the antenna devices 104A and 104B, the width of the coupling contribution portion 20C of the second coil is large, so that the directivity of the short-range wireless communication in the direction between the third side S3 and the fourth side S4 illustrated in FIG. 15 is expanded.

In the examples illustrated in FIGS. 16A, 16B, and FIG. 17, the first coil 10 has a spiral shape with an outer periphery and an inner periphery, and a crossover conductor 12 connecting an end portion of the outer periphery and an end portion of the inner periphery is provided between the second coil opening CO2 and the third coil opening CO3 of the second coil 20. With this configuration, an intersecting portion of the first coil conductor 11 and the second coil conductor 21 and the above-described crossover conductor 12 can be provided close to each other. That is, an insulation portion of the first coil conductor 11 and the second coil conductor 21, and an insulation portion of the vicinity of the outer peripheral end and the inner peripheral end of the first coil conductor 11 can be combined. The number of inter-layer connection conductors and a size of an arrangement range thereof can thus be reduced or prevented.

Fifth Preferred Embodiment

In a fifth preferred embodiment of the present invention, an electronic apparatus including an antenna device in which unnecessary coupling between a second coil and a first coil is reduced or prevented by configuring the second coil will be described.

Figure 18:
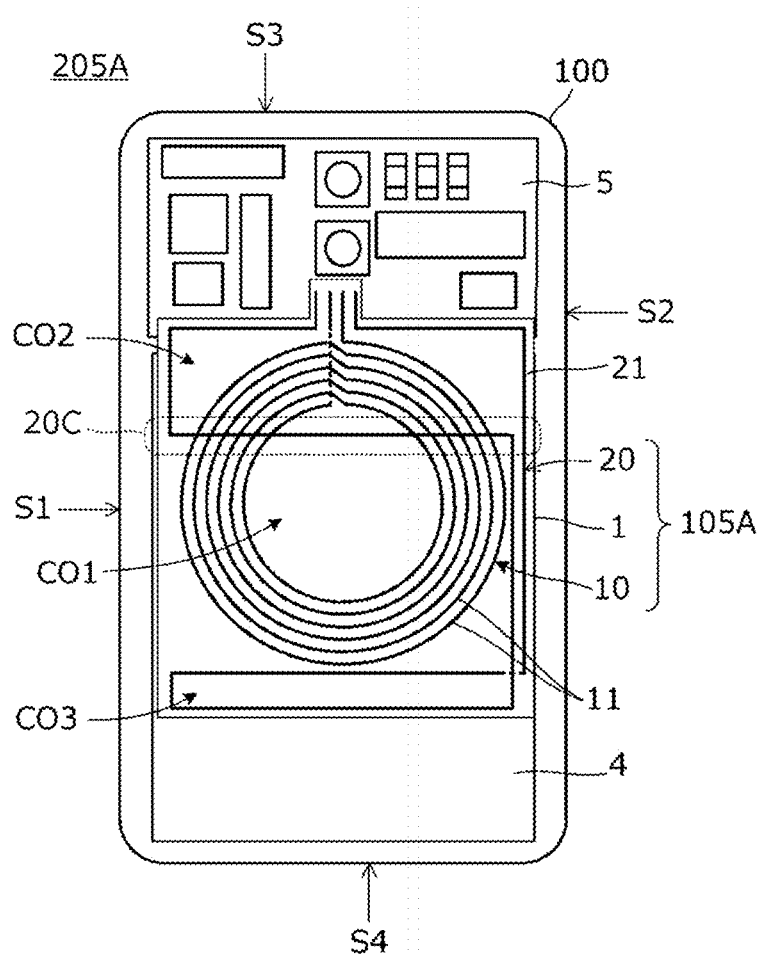
FIG. 18 is a plan view illustrating an electronic apparatus 205A according to a fifth preferred embodiment of the present invention.

FIG. 18 is a plan view illustrating an electronic apparatus 205A according to the fifth preferred embodiment. FIG. 18 illustrates a state in which half or substantially half of the housing 100 is detached to expose the inside of the electronic apparatus 205A. The electronic apparatus 205A includes the rectangular or substantially rectangular plate-shaped housing 100 including the first side S1 and the second side S2 which are long sides and the third side S3 and the fourth side S4 which are short sides, and an antenna device 105A included in the housing 100.

The antenna device 105A includes the first coil 10 and the second coil 20 provided on the insulating base member 1. The first coil 10 includes the first coil conductor 11 that is spirally wound a plurality of number of times around the first coil opening CO1. The second coil 20 includes the second coil conductor 21 including the rectangular or substantially rectangular second coil opening CO2 and the rectangular or substantially rectangular third coil opening CO3.

Figure 19:
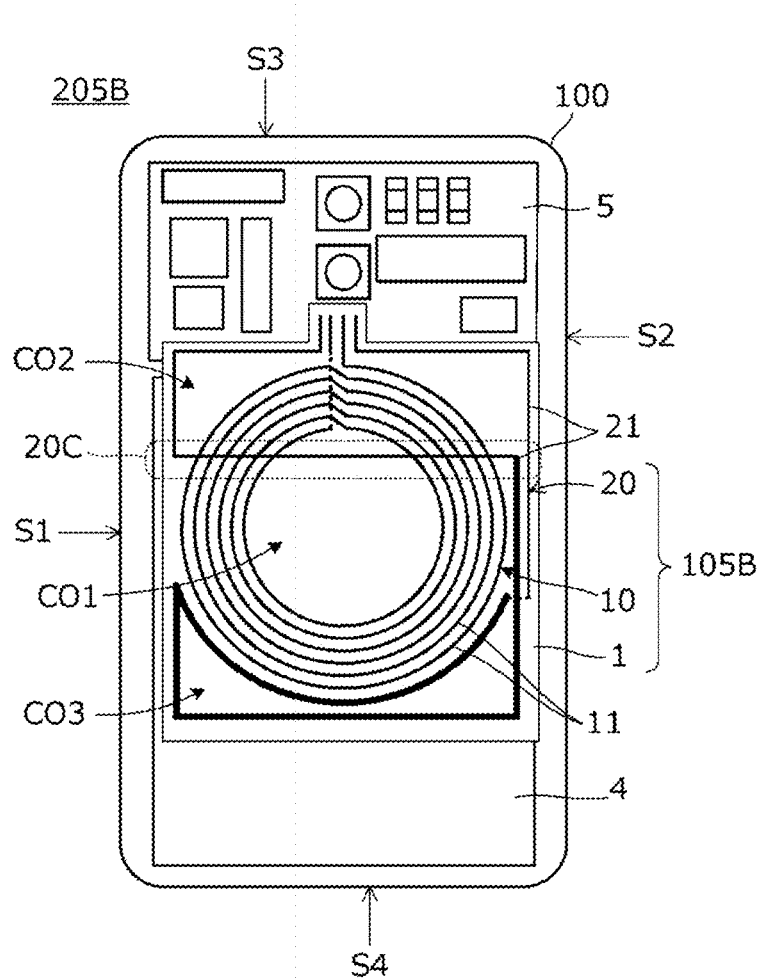
FIG. 19 is a plan view illustrating another electronic apparatus 205B according to the fifth preferred embodiment of the present invention.

FIG. 19 is a plan view illustrating another electronic apparatus 205B according to the fifth preferred embodiment. The electronic apparatus 205B includes the housing 100 and an antenna device 105B included in the housing 100.

The antenna device 105B includes the first coil 10 and the second coil 20 provided on the insulating base member 1. The first coil 10 includes the first coil conductor 11 that is spirally wound a plurality of number of times around the first coil opening CO1. The second coil 20 includes the second coil conductor 21 including the rectangular or substantially rectangular second coil opening CO2 and the third coil opening CO3 along the first coil 10. The line width of the coil conductor defining the third coil opening CO3 in the second coil 20 is larger than the line width of the coil conductor defining the second coil opening CO2. Other configurations are the same or substantially the same as those of the electronic apparatus 205A.

The present preferred embodiment provides the following advantageous effects.

(a) A portion of the first coil 10 overlaps with the second coil opening CO2 and the third coil opening CO3 is arranged at a position not overlapping with the second coil opening CO2 in plan view of the first coil opening CO1, so that unnecessary coupling between the second coil 20 and the first coil 10 is reduced or prevented by coupling between the third coil opening CO3 of the second coil 20 and the first coil 10. That is, coupling between the second coil opening CO2 of the second coil 20 and the first coil 10 and coupling between the third coil opening CO3 of the second coil 20 and the first coil 10 can be made opposite in polarity by appropriately determining the size of the third coil opening CO3 and the winding direction of the second coil conductor 21 defining the third coil opening CO3 in accordance with the position of the coupling contribution portion 20C. When absolute values of coupling amounts of both of them are equal or substantially equal to each other, unnecessary coupling between the first coil 10 and the second coil 20 is canceled.

In particular, a portion of the third coil opening CO3 of the second coil 20 is located along the first coil 10 in the electronic apparatus 205B. Therefore, the above-described advantageous effects of reducing the unnecessary coupling is high even if the size of the third coil opening CO3 of the second coil 20 is small.

(b) A resistance component and an inductance component of the coil conductor that does not contribute to communication are reduced or prevented by increasing the line width of the coil conductor defining the third coil opening CO3 as in the antenna device 105B.

(c) The coupling contribution portion 20C of the second coil 20 can be located closer to the third side S3 side, which is the front end of the electronic apparatus 205A or 205B (the above-described unnecessary coupling can be reduced or prevented also with such arrangement). Accordingly, a peak of strength of coupling to the communication partner-side coil (the communication partner-side coil 30 in the example illustrated in FIG. 10) of the communication partner apparatus can be shifted to the front end side of the electronic apparatus 205A or 205B. Further, the coupling contribution portion 20C of the second coil 20 may be closer to the fourth side S4 side in order to expand the communicable area.

Sixth Preferred Embodiment

In a sixth preferred embodiment of the present invention, in particular, a structure of intersecting portion of a first coil conductor and a second coil conductor in an antenna device will be described.

Figure 20:
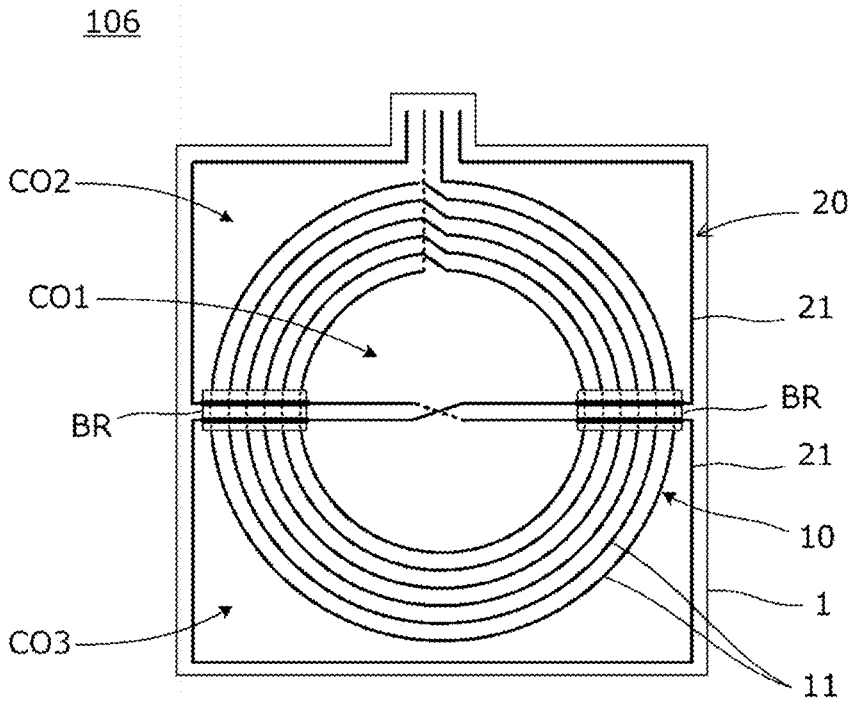
FIG. 20 is a plan view of an antenna device 106 according to a sixth preferred embodiment of the present invention.

FIG. 20 is a plan view of an antenna device 106 according to the sixth preferred embodiment. The antenna device 106 includes the first coil 10 and the second coil 20 provided on the insulating base member 1. The first coil 10 includes the first coil conductor 11 that is spirally wound a plurality of number of times around the first coil opening CO1. The second coil 20 includes the second coil conductor 21 including the rectangular or substantially rectangular second coil opening CO2 and the rectangular or substantially rectangular third coil opening CO3. In FIG. 20, bridge portions BR indicate portions where the first coil conductor 11 and the second coil conductor 21 intersect with each other in plan view.

Figure 21:
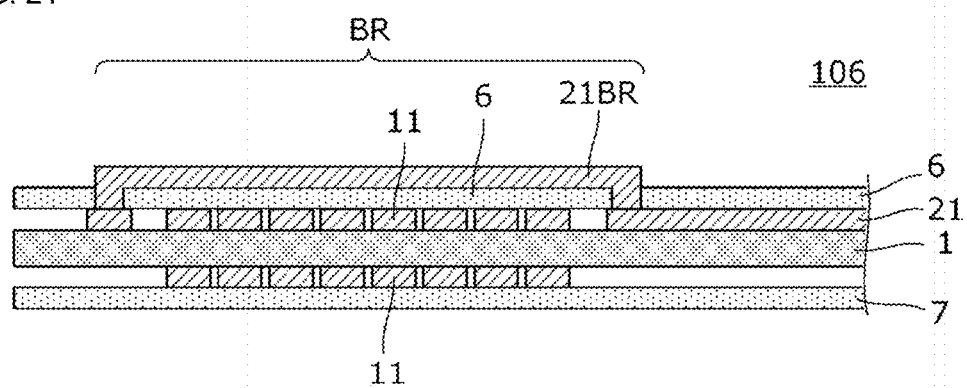
FIG. 21 is a cross-sectional view of a portion passing through a bridge portion BR in FIG. 20.

FIG. 21 is a cross-sectional view of a portion passing through the above-described bridge portion BR. The antenna device 106 includes the single base member 1, the first coil 10 includes the first coil conductor 11 provided on the base member 1, and an insulator layer 6 for insulating the first coil conductor 11 and the second coil conductor 21 is provided at a portion overlapping with the first coil 10 and its vicinity in the second coil 20 in plan view of the first coil opening CO1. An insulator layer 7 is also provided on the lower surface of the base member 1. The insulator layers 6 and 7 are, for example, polyimide films or layers of any of various resist inks.

A second coil conductor 21BR of each bridge portion BR provided on the upper surface of the insulator layer 6 is a conductor pattern formed by applying and solidifying conductive paste such as silver paste, for example. When through-holes are formed in advance in the insulator layer 6, the through-holes are filled with the conductive paste by applying the conductive paste, so that the corresponding portions act as via conductors.

Although the insulator layers 6 and 7 are depicted as if they are rigid members while giving priority to clarity of the drawing in FIG. 21, the insulator layers 6 and 7 are flexible and the first coil conductor 11 is entirely or partially embedded in the insulator layers 6 and 7. The same applies to other preferred embodiments described below.

The bridge portions BR may be protected by covering formation surfaces of the bridge portions BR with resist films, for example.

In the example illustrated in FIG. 21, the first coil conductors 11 are provided on both surfaces of the base member 1, and the first coil conductors 11 on both surfaces of the base member 1 are connected to each other with via conductors interposed therebetween at a plurality of portions within a spirally wound range. In other words, the first coil conductors 11 on both surfaces of the base member 1 are connected in parallel. As a result, a resistance component of the first coil 10 is reduced or prevented.

The present preferred embodiment provides the following advantageous effects.

(a) The second coil conductor 21 can be provided while the first coil conductors 11 are provided on both surfaces of the base member 1. It is therefore not necessary to provide the first coil conductor 11 in one layer at the portions where the first coil conductor and the second coil conductor intersect with each other. This can reduce the number of via conductors and reduce or prevent resistance components of the first coil conductors 11.

(b) As compared with a case where a flexible substrate having equal to or more than three layers is used as a base member, the base member 1 can be an inexpensive flexible substrate with a two-layer structure, thus reducing the cost.

(c) When the silver paste is used as a bridge conductor, manufacturing is facilitated.

In the example illustrated in FIG. 20, all of the intersecting portions of the first coil conductors 11 and the second coil conductor 21 are defined by the bridge portions BR, a portion thereof may be the bridge portion BR.

Seventh Preferred Embodiment

In a seventh preferred embodiment of the present invention, an antenna device further including a magnetic body in addition to the antenna device including the bridge portions described in the sixth preferred embodiment will be described.

Figure 22:
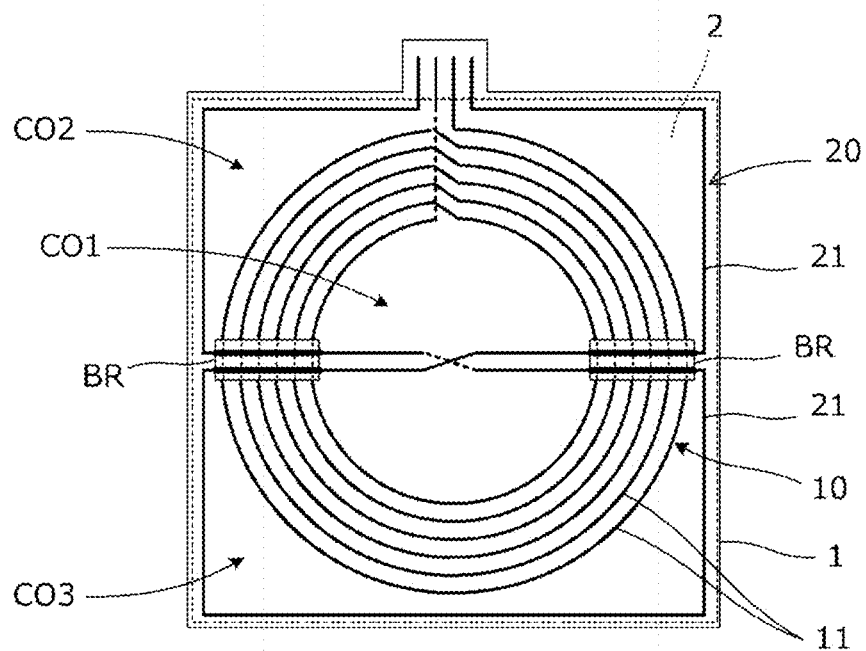
FIG. 22 is a plan view of an antenna device 107A according to a seventh preferred embodiment of the present invention.
Figure 23:
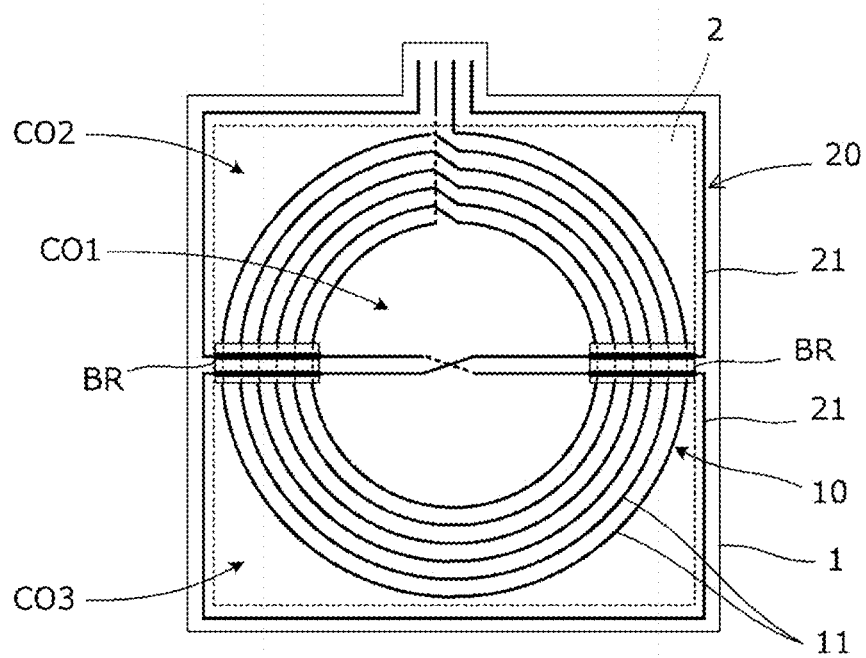
FIG. 23 is a plan view of an antenna device 107B according to the seventh preferred embodiment of the present invention.

FIG. 22 is a plan view of an antenna device 107A according to the seventh preferred embodiment, and FIG. 23 is a plan view of an antenna device 107B according to the seventh preferred embodiment. The configurations of the insulating base member 1, the first coil 10, the second coil 20, and the bridge portions BR are the same or substantially the same as the configurations of the respective portions in the antenna device 106 described in the sixth preferred embodiment. Each of the antenna devices 107A and 107B includes a magnetic body 2 overlapping with the first coil 10 in plan view of the first coil opening CO1. The magnetic body 2 is provided by forming a ferromagnetic material into a sheet shape. The ferromagnetic material is, for example, ferrite, an amorphous magnetic body, a nanocrystal magnetic body, or the like.

Figure 24:
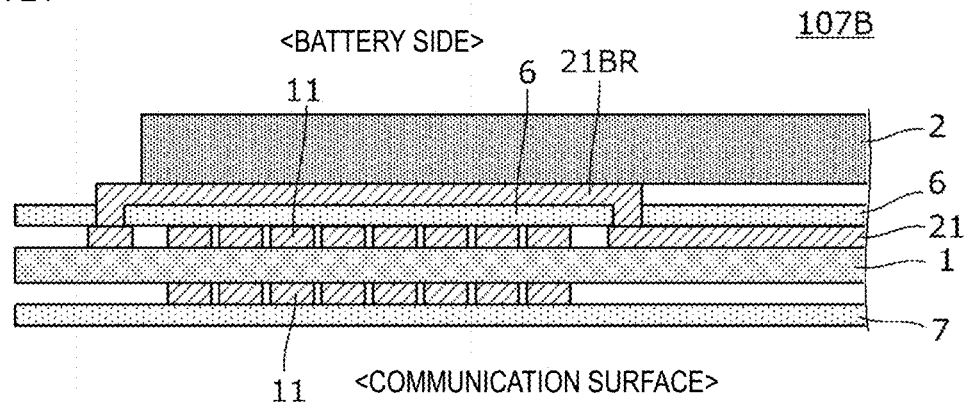
FIG. 24 is a cross-sectional view of a portion passing through the bridge portion BR in FIG. 23.

FIG. 24 is a cross-sectional view of a portion of the antenna device 107B, which passes through the bridge portion BR. In FIG. 24, a lower portion is a surface (communication surface) facing the communication partner-side coil, and an upper portion is a surface on which the battery and the like are provided. The antenna device 107B includes the single base member 1, the first coil 10 includes the first coil conductors 11 provided on the base member 1, and the insulator layer 6 for insulating the first coil conductor 11 and the second coil conductor 21 is provided at a portion overlapping with the first coil 10 and its vicinity in the second coil 20 in plan view of the first coil opening CO1. The magnetic body 2 is provided on (attached to) the upper surface of the insulator layer 6 (the side of the surfaces of the bridge portions BR on which the second coil conductors 21BR are provided).

Although the bridge portions BR are provided on the side where the magnetic body 2 is provided in the example illustrated in FIG. 23 and FIG. 24, the bridge portions BR may be provided on the side where the magnetic body 2 is not provided. When the bridge portions BR are provided on the side where the magnetic body 2 is provided, the bridge portions BR are protected by an adhesive layer of the magnetic body 2. It is therefore not necessary to separately provide protective layers of the bridge portions BR, so that the thickness can be reduced as a whole.

When a magnetic body close to the first coil 10 and the second coil 20 is provided, as illustrated in FIG. 22, the magnetic body 2 may overlap with the entire or substantially the entire first coil 10 and the entire or substantially the entire second coil 20. In addition, as illustrated in FIG. 23, the directivity of the second coil 20 may be adjusted or unnecessary coupling between the first coil 10 and the second coil 20 may be further reduced or prevented by providing an overlapping portion and a non-overlapping portion of the magnetic body 2 to the second coil 20.

Eighth Preferred Embodiment

In an eighth preferred embodiment of the present invention, an antenna device in which a shape of a magnetic body is different from that in the antenna device described in the seventh preferred embodiment will be described.

Figure 25:
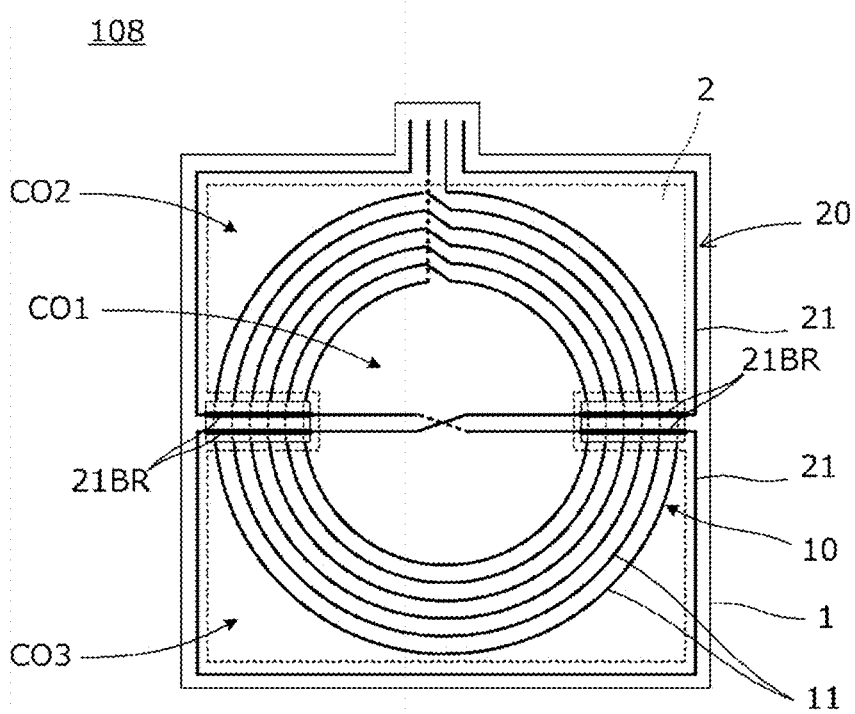
FIG. 25 is a plan view of an antenna device 108 according to an eighth preferred embodiment of the present invention.

FIG. 25 is a plan view of an antenna device 108 according to the eighth preferred embodiment. The configurations of the insulating base member 1, the first coil 10, the second coil 20, and the bridge portions BR are the same or substantially the same as the configurations of the respective portions in the antenna device 106 described in the sixth preferred embodiment. The antenna device 108 includes the magnetic body 2 overlapping with the first coil 10 in plan view of the first coil opening CO1.

Figure 26:
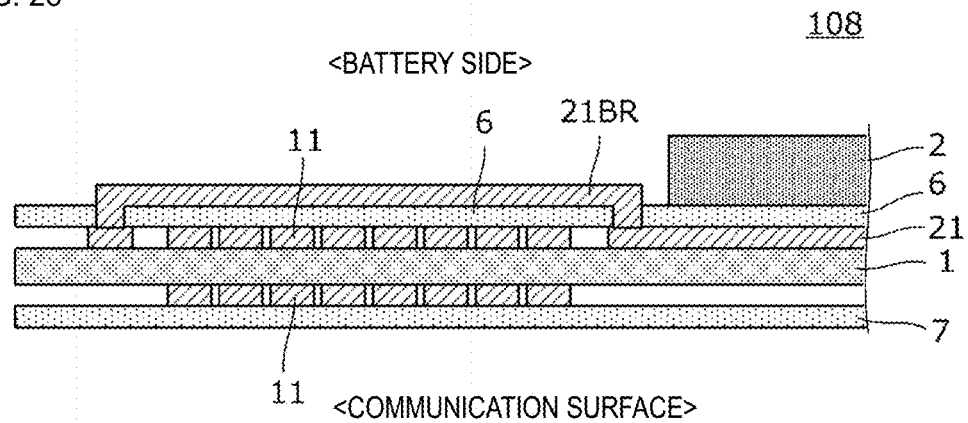
FIG. 26 is a cross-sectional view of a portion passing through the bridge portion BR in FIG. 25.

FIG. 26 is a cross-sectional view of a portion passing through the bridge portion BR. The antenna device 108 includes the single base member 1, the first coil 10 includes the first coil conductor 11 provided on the base member 1, and an insulator layer 6 for insulating the first coil conductor 11 and the second coil conductor 21 is provided at a portion overlapping with the first coil 10 and its vicinity in the second coil 20 in plan view of the first coil opening CO1. The magnetic body 2 is provided on (attached to) the upper surface of the insulator layer 6.

The magnetic body 2 does not overlap with the bridge portions BR and has a shape that is cut out along the bridge portions BR. With such a shape and arrangement of the magnetic body 2, an increase in the thicknesses of the bridge portions BR by providing the second coil conductors 21BR is reduced or prevented, and the overall thickness can be reduced. In the example illustrated in FIG. 25 and FIG. 26, although the magnetic body 2 is cut out, holes may be provided in the magnetic body 2.

Ninth Preferred Embodiment

In a ninth preferred embodiment of the present invention, several antenna devices in which a positional relationship between a second coil and a magnetic body is different from the examples described above will be exemplified.

FIGS. 27A to 27D are plan views of antenna devices according to the present preferred embodiment. Each of an antenna device 109A illustrated in FIG. 27A, an antenna device 109B illustrated in FIG. 27B, an antenna device 109C illustrated in FIG. 27C, and an antenna device 109D illustrated in FIG. 27D includes the base member 1 on which the first coil 10 and the second coil 20 are provided and the magnetic body 2 provided to overlap with the base member 1. In FIGS. 27A to 27D, the near side in each drawing is a communication surface.

Although the magnetic body 2 may overlap with the entire or substantially the entire second coil 20 in plan view of the first coil opening CO1, it may be provided so as not to overlap with a portion of the outer peripheral portion of the second coil 20 as illustrated in FIGS. 27A to 27D. For example, any one of a plurality of combinations in which the magnetic body 2 overlaps/does not overlap with each of the four sides of the second coil 20 may be used. Further, for example, in addition to the examples illustrated in FIGS. 27A to 27D, a configuration in which the left and right sides of the second coil opening CO2 or the third coil opening CO3 overlap with the magnetic body 2 and the left and right sides of the other coil opening do not overlap with the magnetic body 2 is also effective.

Figure 27A:
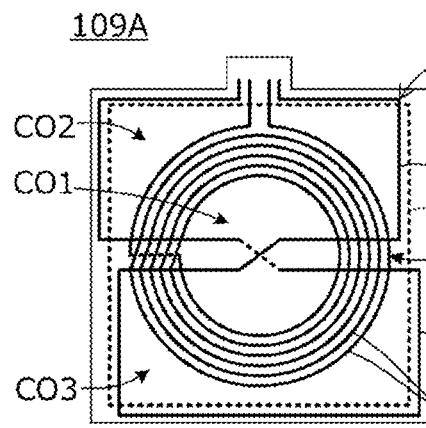
FIGS. 27A to 27D are plan views of antenna devices according to a ninth preferred embodiment of the present invention.

In the antenna device 109A illustrated in FIG. 27A, one or more of the left and right sides of the second coil conductor 21 of the second coil 20 overlap with the magnetic body 2 in the orientation illustrated in FIG. 27A in plan view of the first coil opening CO1. The portions of the right and left sides of the second coil conductor 21, which overlap with the magnetic body 2, contribute to short-range wireless communication. Therefore, magnetic field coupling between the second coil 20 and the communication partner-side coil can be strengthened depending on the size of the communication partner-side coil.

Figure 27B:
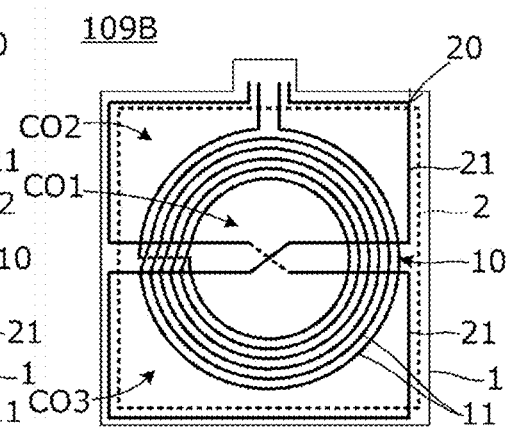

In the antenna device 109B illustrated in FIG. 27B, of the second coil conductor 21 of the second coil 20, the magnetic body 2 overlaps with the right side of the second coil conductor 21 in plan view of the first coil opening CO1.

Figure 27C:
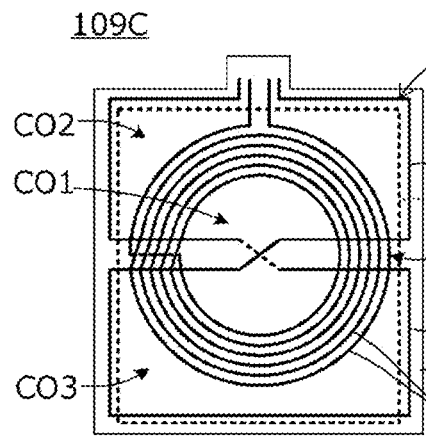

In the antenna device 109C illustrated in FIG. 27C, of the second coil conductor 21 of the second coil 20, the magnetic body 2 overlaps with the lower side of the second coil conductor 21 in plan view of the first coil opening CO1.

Figure 27D:
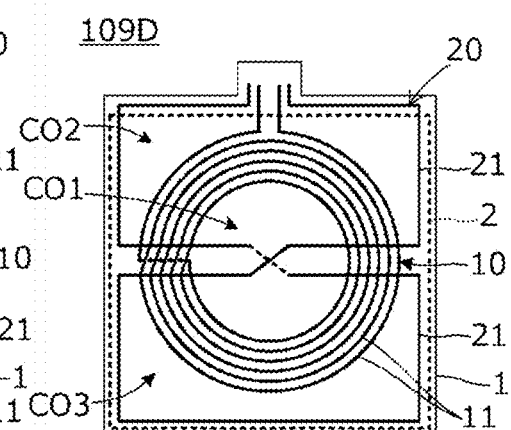

In the antenna device 109D illustrated in FIG. 27D, of the second coil conductor 21 of the second coil 20, the magnetic body 2 overlaps with the right and left sides and the lower side of the second coil conductor 21 in plan view of the first coil opening CO1.

The portion of the second coil conductor 21, which overlaps with the magnetic body 2, contributes to the short-range wireless communication depending on the above-described arrangement of the magnetic body 2, so that the directivity of the short-range wireless communication can be determined by setting the portion overlapping with the magnetic body. In FIGS. 27A to 27D, although the examples in which the second coil 20 is a FIG. 8-shaped coil conductor pattern are illustrated, the directivity can be determined by setting an overlapping state of the magnetic body even when the second coil 20 includes a coil conductor pattern including the single second coil opening CO2 as illustrated in FIG. 1A or the like.

Tenth Preferred Embodiment

In a tenth preferred embodiment of the present invention, an electronic apparatus including an antenna device including a magnetic body will be exemplified.

Figure 28:
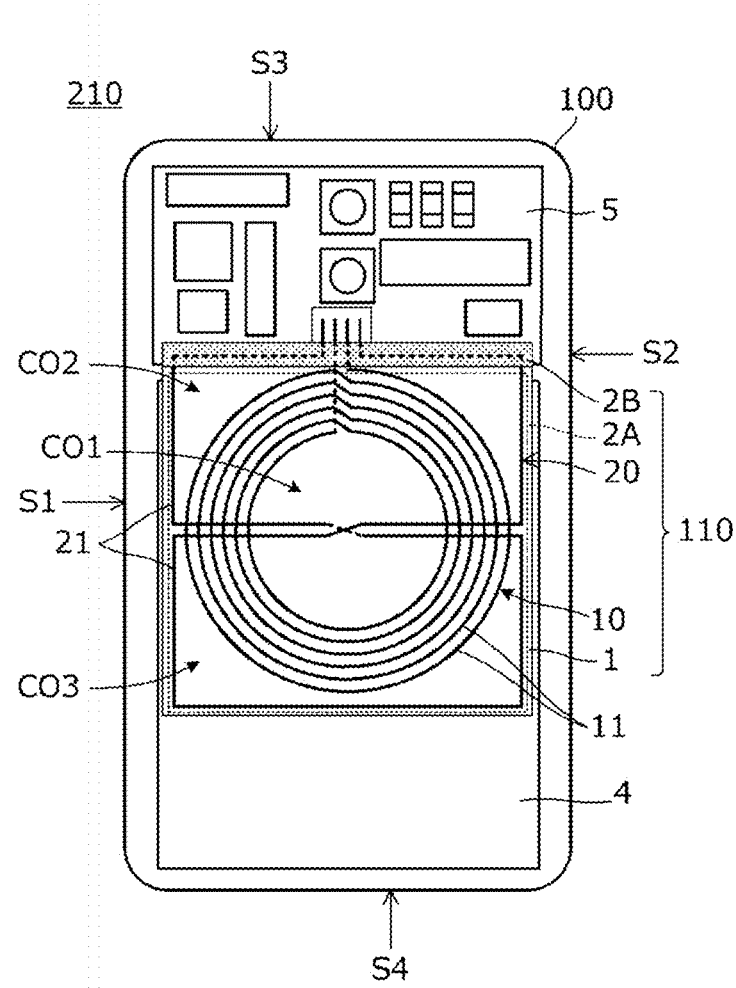
FIG. 28 is a plan view illustrating an electronic apparatus 210 according to a tenth preferred embodiment of the present invention.

FIG. 28 is a plan view illustrating an electronic apparatus 210 according to the tenth preferred embodiment. The tenth preferred embodiment is different from the example illustrated in FIG. 22 and FIG. 23 in the seventh preferred embodiment in that the magnetic body 2 is partially provided also on the communication surface side.

In FIG. 28, an antenna device 110 includes the base member 1, the first coil 10, the second coil 20, and magnetic bodies 2A and 2B.

The magnetic body 2A is located on the rear surface side of the second coil 20. That is, it is located on the side far from the communication surface (the surface illustrated on the near side in FIG. 28). The magnetic body 2B is closer to the communication surface side of the electronic apparatus 210 than the second coil 20. In addition, the magnetic body 2B faces (overlaps in plan view of the first coil opening CO1) the coil conductor of the second coil conductor 21, which extends in the left and right direction in a front end portion of the electronic apparatus 210 in the orientation illustrated in FIG. 28. That is, the second coil 20 includes a portion close to the third side S3 and parallel or substantially parallel to the third side S3, and the magnetic body 2B located on the communication surface side of the portion is provided.

According to the present preferred embodiment, the second coil conductor 21 on the rear surface side of the magnetic body 2B is magnetically invisible when viewed from the communication partner-side coil, and the directivity of the second coil 20 is directed toward the more front end direction of the electronic apparatus 210.

Although FIG. 28 illustrates an example in which the second coil 20 is a figure 8-shaped coil conductor pattern, the second coil 20 may be include a coil conductor pattern including the single second coil opening CO2 as illustrated in FIG. 1A and the like.

As described above, the second coil conductor can be hidden by the magnetic body 2B by arranging the magnetic body 2B on the communication surface side. This also makes it possible to set an overlapping state of the magnetic body with respect to each side of the second coil conductor 21 and to determine the directivity.

Eleventh Preferred Embodiment

In an eleventh preferred embodiment of the present invention, an antenna device including a heat dissipation member is exemplified.

Figure 29:
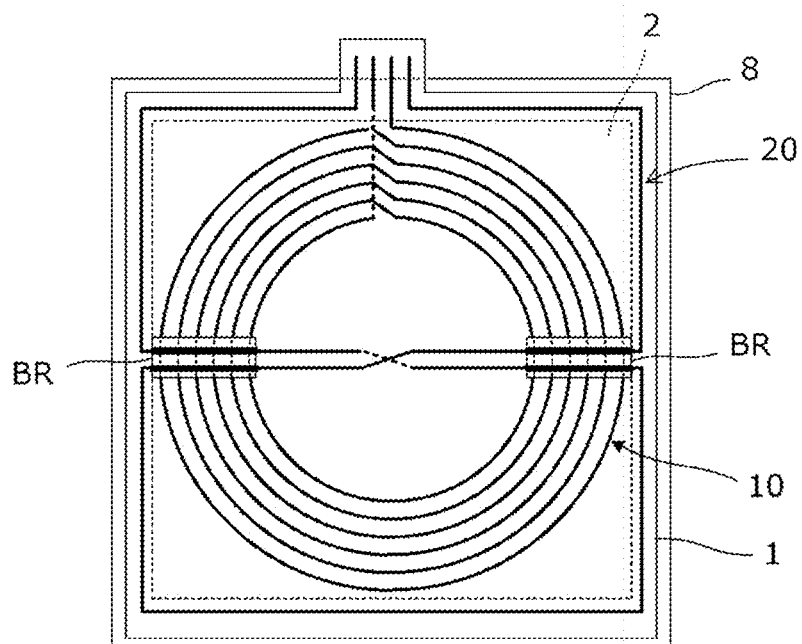
FIG. 29 is a plan view of an antenna device 111A according to an eleventh preferred embodiment of the present invention.

FIG. 29 is a plan view of an antenna device 111A according to the eleventh preferred embodiment. The configurations of the insulating base member 1, the first coil 10, the second coil 20, and the magnetic body 2 are the same or substantially the same as the configurations of the respective portions in the antenna device 108 described in the eighth preferred embodiment. The antenna device 111A includes a heat dissipation member 8 overlapping with the magnetic body 2.

Figure 30:
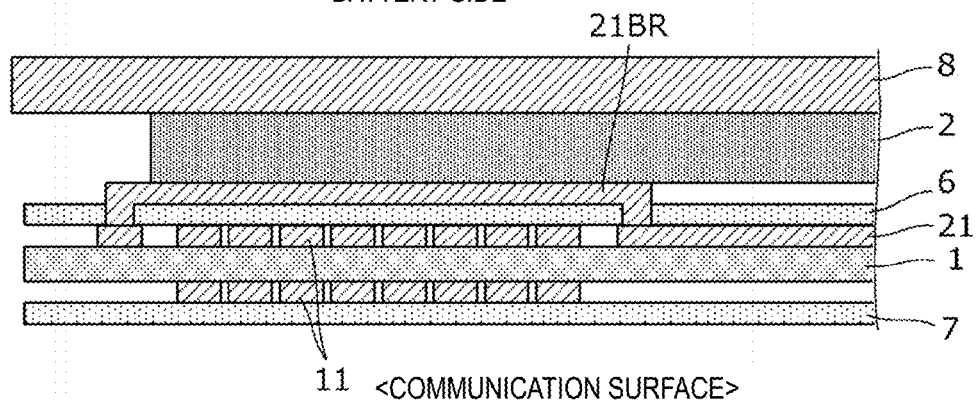
FIG. 30 is a partial cross-sectional view of the antenna device 111A.

FIG. 30 is a partial cross-sectional view of the antenna device 111A. The antenna device 111A includes the base member 1, the first coil conductor 11, the second coil conductor 21, the insulator layers 6 and 7, and the magnetic body 2. The heat dissipation member 8 overlaps with the magnetic body 2. The heat dissipation member 8 is, for example, a graphite sheet, a copper foil, a vapor chamber, or the like.

The heat dissipation member 8 diffuses and equalizes heat generated by the first coil 10 and the magnetic body 2 and dissipates the heat. Accordingly, local heat generation of an electronic apparatus including the antenna device 111A can be reduced or prevented.

Figure 31:
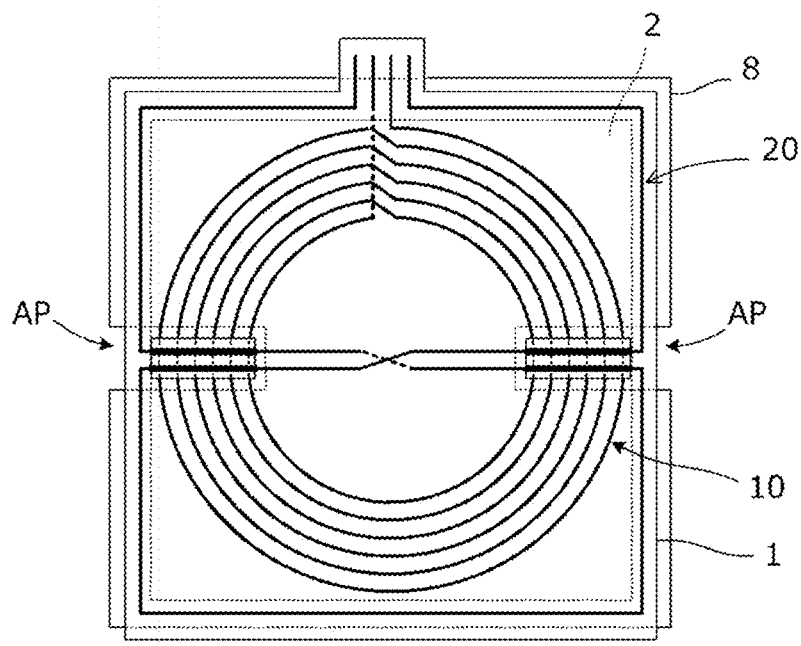
FIG. 31 is a plan view of another antenna device 111B according to the eleventh preferred embodiment of the present invention.
Figure 32:
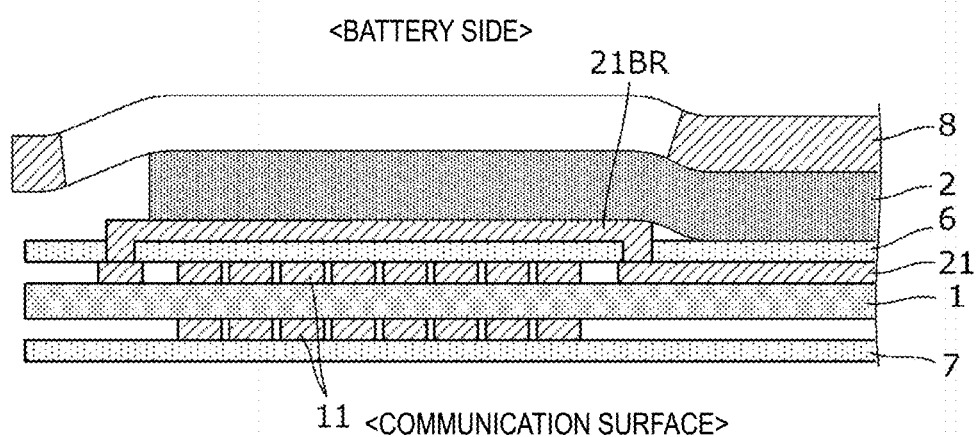
FIG. 32 is a partial cross-sectional view of the antenna device 111B.

FIG. 31 is a plan view of another antenna device 111B according to the eleventh preferred embodiment. FIG. 32 is a partial cross-sectional view of the antenna device 111B. This antenna device 111B is different from the antenna device 111A in that openings AP are provided in the heat dissipation member 8. The openings AP of the heat dissipation member 8 are provided at positions overlapping with the bridge portions BR. That is, the heat dissipation member 8 does not overlap with the bridge portions BR. With such a shape and arrangement of the heat dissipation member 8, an increase in the thicknesses of the bridge portions BR by providing the second coil conductors 21BR is reduced or prevented, and the overall thickness can be reduced. In addition, deterioration in transmission performance can be avoided as compared with a case where the thickness is reduced by providing openings in the magnetic body 2.

Twelfth Preferred Embodiment

In a twelfth preferred embodiment of the present invention, an antenna device including a heat dissipation member having a configuration different from the example described in the eleventh preferred embodiment will be exemplified.

Figure 33:
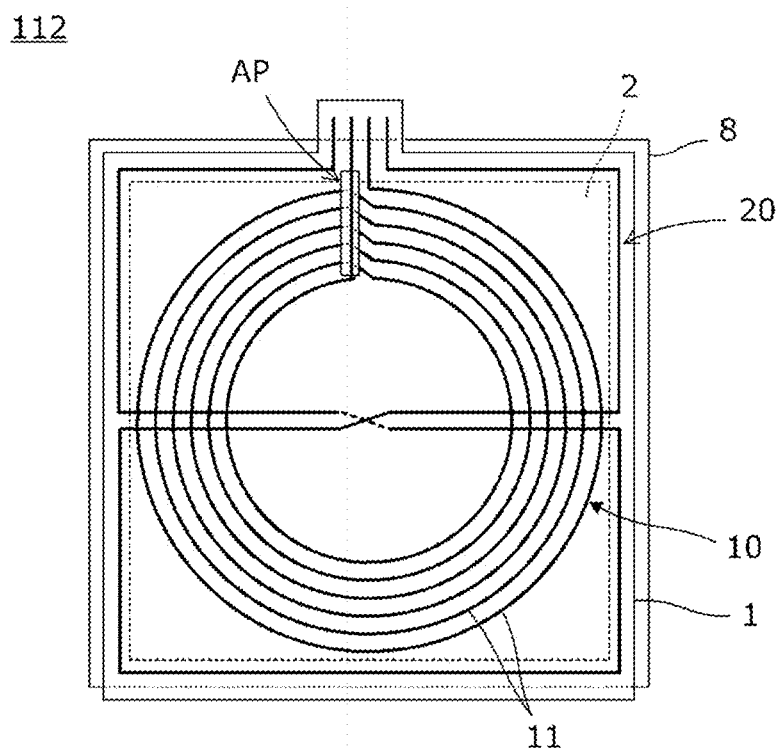
FIG. 33 is a plan view of an antenna device 112 according to a twelfth preferred embodiment of the present invention.
Figure 34:
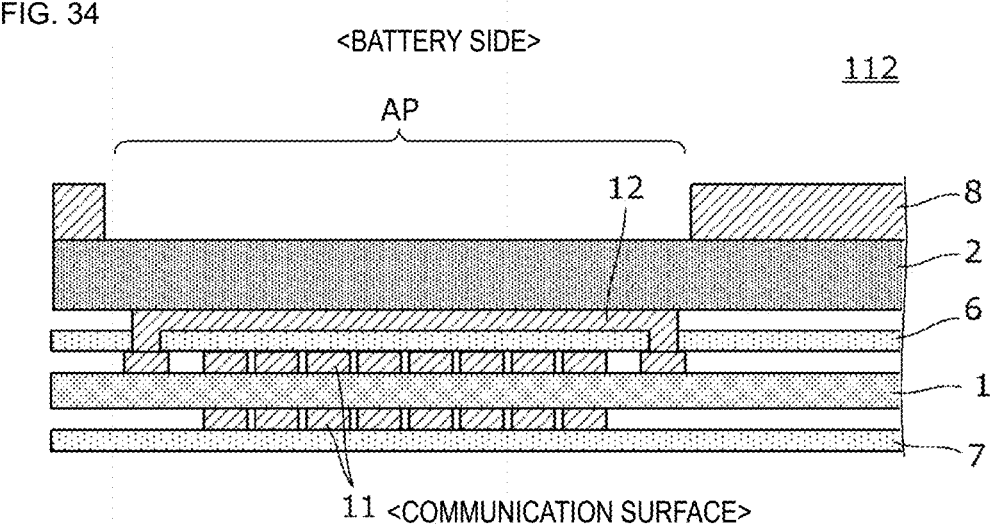
FIG. 34 is a partial cross-sectional view of the antenna device 112.

FIG. 33 is a plan view of an antenna device 112 according to the twelfth preferred embodiment. FIG. 34 is a partial cross-sectional view of the antenna device 112. The configurations of the insulating base member 1, the first coil 10, the second coil 20, and the magnetic body 2 are the same or substantially the same as the configurations of the respective portions in the antenna device 108 described in the eighth preferred embodiment. The antenna device 112 includes the heat dissipation member 8 overlapping with the magnetic body 2. The heat dissipation member 8 includes an opening AP. The opening AP of the heat dissipation member 8 is provided at a position corresponding to a portion (crossover conductor) of the first coil conductor 11, which extends from the inner peripheral end toward the outer peripheral direction. That is, the heat dissipation member 8 does not overlap with the crossover conductor 12. FIG. 34 is a partial cross-sectional view of the antenna device 112 at a position passing through the opening AP.

With such a shape and arrangement of the heat dissipation member 8, an increase in the thickness by providing the above-described crossover conductor 12 on the first coil 10 is reduced or prevented, and the overall thickness can be reduced. In addition, deterioration in transmission performance can be avoided as compared with a case where the thickness is reduced by providing openings in the magnetic body 2.

Thirteenth Preferred Embodiment

In a thirteenth preferred embodiment of the present invention, an antenna device including a coil conductor with a characteristic configuration will be exemplified.

FIG. 35 is a plan view of an antenna device 113 according to the thirteenth preferred embodiment. FIG. 36 is a cross-sectional view of a portion cut along a line Y-Y in FIG. 35.

The antenna device 113 includes the first coil 10 and the second coil 20. The first coil 10 includes the first coil conductor 11 that is spirally wound a plurality of number of times around the first coil opening CO1. The second coil 20 includes the second coil conductor 21 including the rectangular or substantially rectangular second coil opening CO2. In the present preferred embodiment, there is no insulating base member on which the coils are provided, such as a flexible printed circuit board, and the first coil 10 and the second coil 20 are independent coil conductors.

Although one coil conductor set is depicted by single line in FIG. 35, one coil conductor set is an assembly of a plurality of conductor wires as illustrated in FIG. 36. An insulating film is provided around each of the plurality of conductor wires, and the conductor wires are not electrically conducted even when they are close to each other. The conductor wires are electrically conducted at winding start portions and winding end portions of the coils by solder bonding or the like, for example. This configuration reduces AC resistance of the coils and improves performance of WCS. In this example, one set of the first coil conductor includes four conductor wires, and one set of the second coil conductor includes three conductor wires. The above-described numbers are merely examples, and the numbers are not limited thereto.

According to the present preferred embodiment, it is not necessary to use an expensive flexible substrate including a thick electrode, and resistance components of the coil conductors are reduced by increasing the cross-sectional areas or the number of coil conductors, thus achieving low loss and high efficiency. As illustrated in FIG. 36, the width or diameter of the second coil conductor 21 of the second coil 20 for the short-range wireless communication for which increase in the resistance component is allowed in comparison with the first coil conductor 11 of the first coil 10 for the non-contact charging may be smaller than the width or diameter of the first coil conductor 11. This makes it possible to reduce or prevent an increase in the thickness of a portion overlapping with the first coil conductor 11 and a portion overlapping with the second coil conductor 21. Moreover, the second coil conductor 21 may be a single ordinary conductor wire instead of an assembly.

Fourteenth Preferred Embodiment

In a fourteenth preferred embodiment of the present invention, an antenna device in which a first coil conductor and a second coil conductor have different configurations will be exemplified.

FIG. 37 is a plan view of an antenna device 114 according to the fourteenth preferred embodiment. FIG. 38 is a cross-sectional view of a portion cut along a line Y-Y in FIG. 37.

The antenna device 114 includes the first coil 10 and the second coil 20 located close to the base member 1 for the second coil conductor. The first coil 10 includes the first coil conductor 11 that is spirally wound a plurality of number of times around the first coil opening CO1. The second coil 20 includes the second coil conductor 21 including the rectangular or substantially rectangular second coil opening CO2 and the rectangular or substantially rectangular third coil opening CO3. In this example, the base member 1 is a flexible substrate, and the second coil conductor 21 is a conductor pattern on the flexible substrate. The first coil conductor 11 is a conductor wire provided separately from the conductor pattern on the base member 1 of the flexible substrate.

According to the present preferred embodiment, the overall thickness can be reduced by configuring the second coil 20 for the short-range wireless communication by the flexible substrate thinner than the first coil conductor 11. Further, mechanical strength is increased by fixing the first coil for non-contact charging on the flexible substrate. Moreover, the first coil conductor 11 can be easily connected to a circuit inside an electronic apparatus with, for example, a gold-plated terminal electrode or a connector provided on the flexible substrate interposed therebetween by joining the front end of the first coil conductor 11 to an electrode provided on the flexible substrate with solder or the like, for example.

Fifteenth Preferred Embodiment

In a fifteenth preferred embodiment of the present invention, an antenna device including an overlapping portion between a first coil and a second coil will be exemplified.

Figure 39:
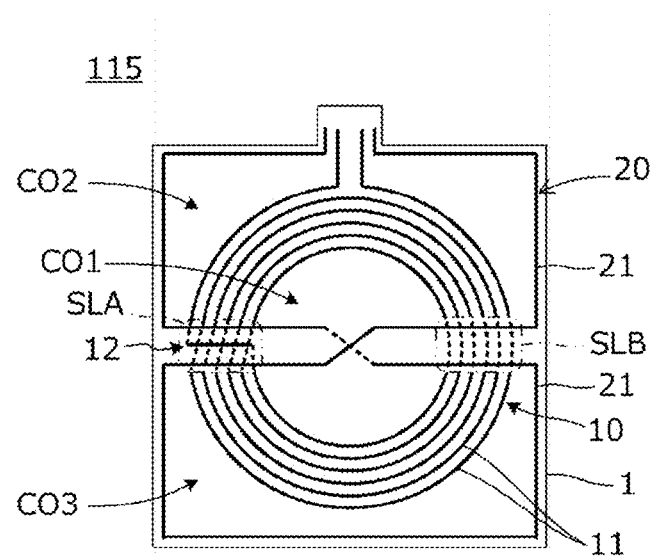
FIG. 39 is a plan view of an antenna device 115 according to a fifteenth preferred embodiment of the present invention.

FIG. 39 is a plan view of an antenna device 115 according to the fifteenth preferred embodiment. The antenna device 115 includes the first coil 10 and the second coil 20 provided on the insulating base member 1. The first coil 10 includes the first coil conductor 11 that is spirally wound a plurality of number of times around the first coil opening CO1. The second coil 20 includes the second coil conductor 21 including the rectangular or substantially rectangular second coil opening CO2 and the rectangular or substantially rectangular third coil opening CO3.

In FIG. 39, the first coil 10 includes first coil conductors on both surfaces of the base member 1, and the second coil 20 includes a second coil conductor on the upper surface of the base member 1. In FIG. 39, a pattern indicated by broken line is a conductor pattern on the lower surface of the base member 1. Solid lines in regions SLA and SLB are conductor patterns only on the upper surface of the base member 1. Solid line patterns of the first coil conductors in the other regions are conductor patterns on both surfaces of the base member 1. The conductor patterns facing each other along both surfaces are connected to each other with via conductors dispersedly provided at a plurality of positions interposed therebetween.

The crossover conductor 12 of the first coil conductor 11 is a conductor pattern extending from the inner peripheral end towards the outer peripheral direction.

The regions SLA and SLB are intersecting portions of the second coil conductor 21 and the first coil conductors 11. As described above, the crossover conductors 12 of the first coil conductors 11 in the intersecting portion of the second coil conductor 21 and the first coil conductors 11 can reduce portions where the conductor patterns on the front and back surfaces intersect with each other in plan view when the base member 1 is the flexible substrate including the conductor patterns on both surfaces. For this reason, the number of via conductors provided in the first coil conductors 11 including a large number of turns can be reduced, thus reducing the cost. Further, portions where the coil conductor including one layer are reduced, so that resistance components of the coil conductors can be reduced.

Sixteenth Preferred Embodiment

In a sixteenth preferred embodiment of the present invention, an antenna device in which a shape of a second coil and a positional relationship of the second coil with a first coil are different from those in the examples described above will be exemplified.

Figure 40A:
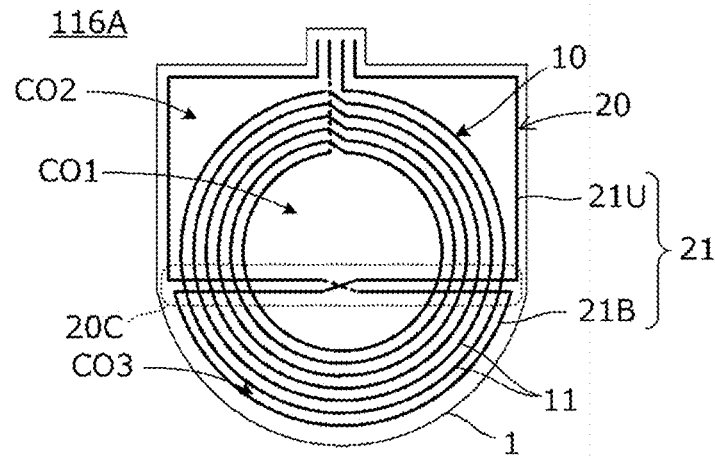
FIGS. 40A to 40C are plan views of antenna devices 116A, 116B, and 116C according to a sixteenth preferred embodiment of the present invention.
Figure 40B:
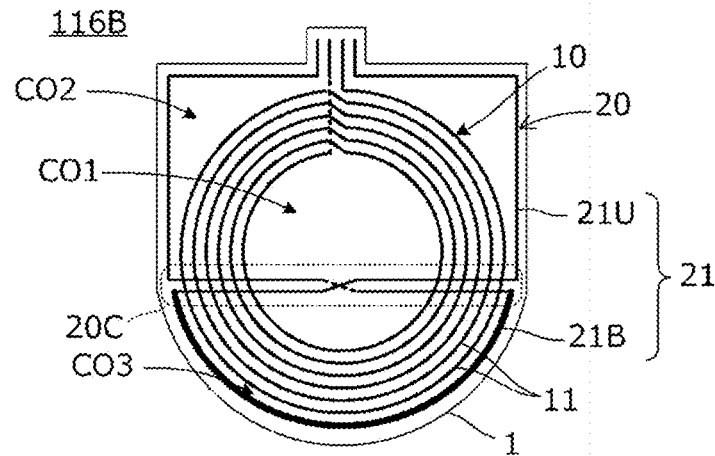
Figure 40C:
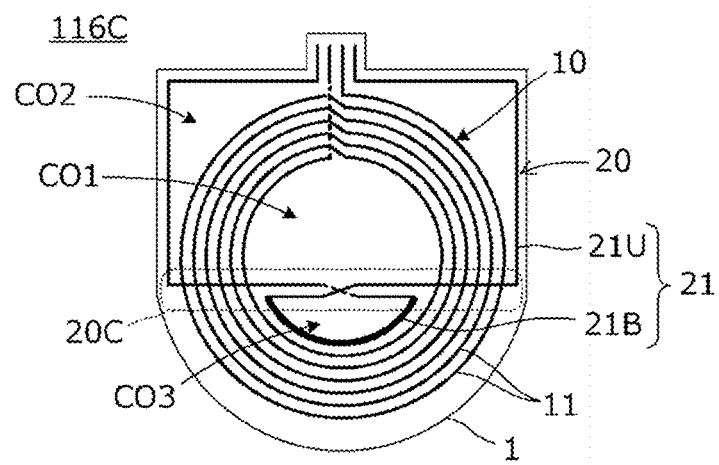

FIGS. 40A to 40C are plan views of antenna devices 116A, 116B, and 116C according to the present preferred embodiment. Each of the antenna devices includes the base member 1, the first coil conductor 11, and the second coil conductor 21.

The second coil conductor 21 includes a second coil conductor 21U that defines the second coil opening CO2 on the upper side than the coupling contribution portion 20C and a second coil conductor 21B that defines the third coil opening CO3 on the lower side than the coupling contribution portion 20C.

In each of the antenna devices 116A, 116B, and 116C, the coupling contribution portion 20C is provided on the lower side of the center of the first coil 10, and the third coil opening CO3 is smaller than the second coil opening CO2. In the antenna devices 116A and 116B, the second coil conductor 21B is provided along the outer periphery of the first coil 10. In the antenna device 116C, the second coil conductor 21B is provided along the inner periphery of the first coil 10.

According to the present preferred embodiment, by the second coil opening CO2 becoming larger, a communicable area in the front end direction (upper side) of an electronic apparatus including the antenna device is expanded. As illustrated in FIGS. 40B and 40C, when a line width and a space of the second coil conductor 21B on the lower side is larger than a line width and a space of the second coil conductor 21U on the upper side, an inductance component of the second coil conductor 21B on the lower side is reduced. With this, a resistance component and an inductance component of the coil conductor that contributes less to communication can be reduced or prevented, and a coupling coefficient to a communication partner-side coil is increased, thus expanding the communicable area.

Further, when the coupling contribution portion 20C is simply shifted from the center of the first coil 10, unnecessary coupling between the first coil 10 and the second coil 20 increases. However, since the second coil conductor 21B is provided along the first coil 10, the unnecessary coupling is reduced or prevented by coupling between the third coil opening CO3 of the second coil conductor 21B and the first coil 10.

Seventeenth Preferred Embodiment

In a seventeenth preferred embodiment of the present invention, an antenna device in which a positional relationship of a second coil with a first coil is different from those in the examples described above will be exemplified.

Figure 41A:
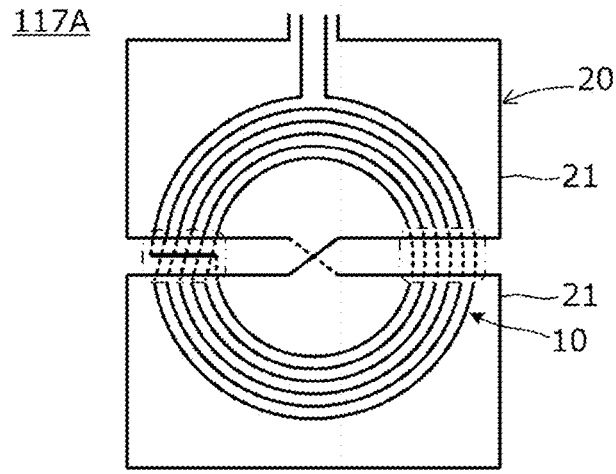
FIGS. 41A to 41C are plan views of antenna devices 117A, 117B, and 117C according to a seventeenth preferred embodiment of the present invention.
Figure 41B:
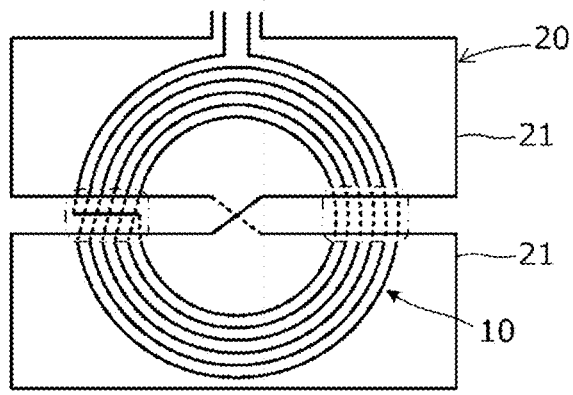
Figure 41C:
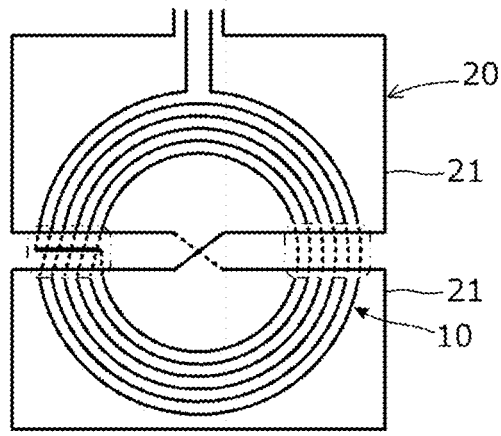
Figure 42A:
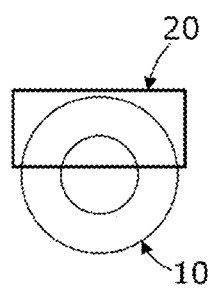
FIGS. 42A to 42E are schematic plan views of antenna devices according to an eighteenth preferred embodiment of the present invention.
Figure 42B:
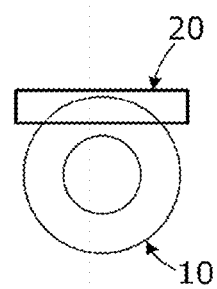
Figure 42C:
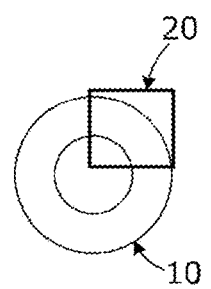
Figure 42D:
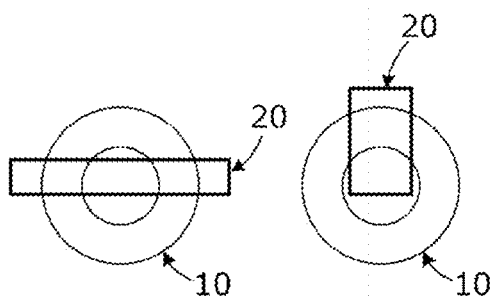
Figure 42E:
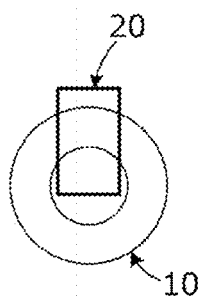
Figure 43A:
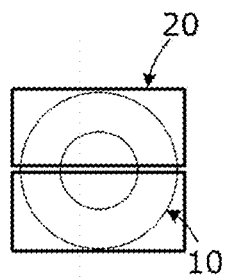
FIGS. 43A to 43J are schematic plan views of other antenna devices according to the eighteenth preferred embodiment of the present invention.
Figure 43B:
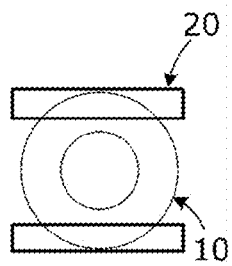
Figure 43C:
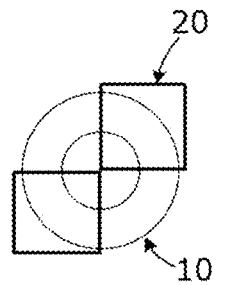
Figure 43D:
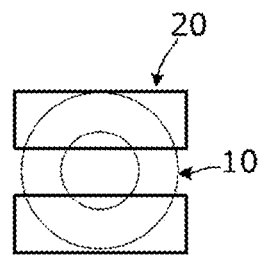
Figure 43E:
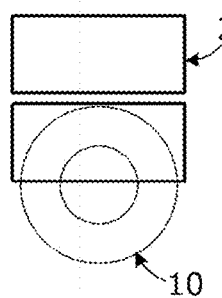
Figure 43F:
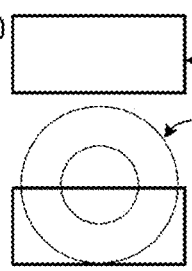
Figure 43G:
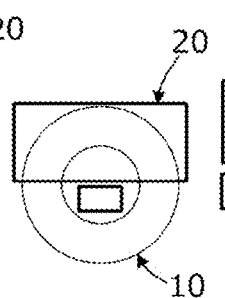
Figure 43H:
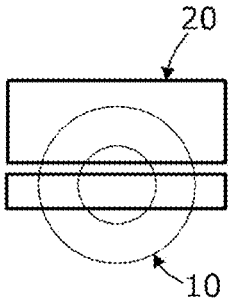
Figure 43I:
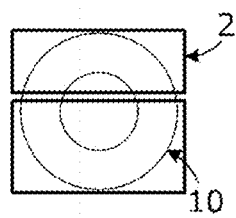
Figure 43J:
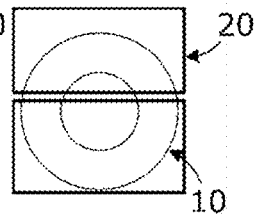
Figure 44A:
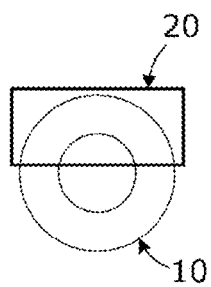
FIGS. 44A to 44M are schematic plan views of antenna devices according to a nineteenth preferred embodiment of the present invention.
Figure 44B:
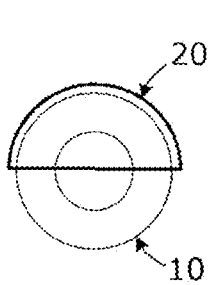
Figure 44C:
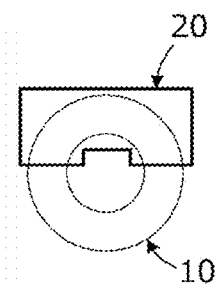
Figure 44D:
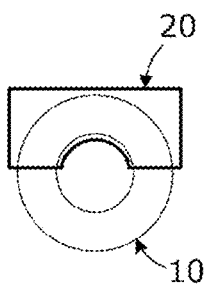
Figure 44E:
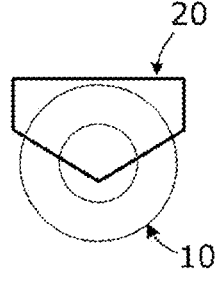
Figure 44F:
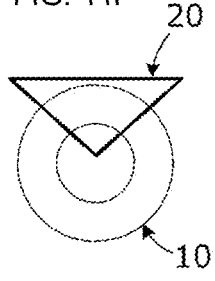
Figure 44G:
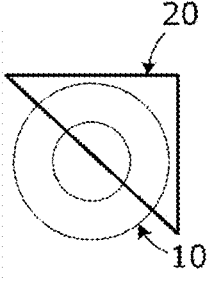
Figure 44H:
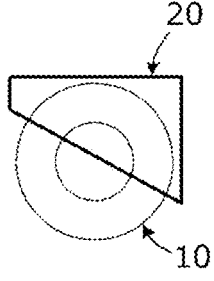
Figure 44I:
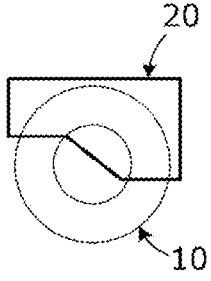
Figure 44J:
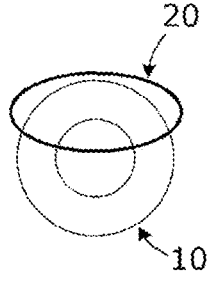
Figure 44K:
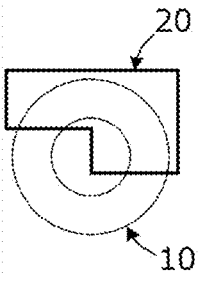
Figure 44L:
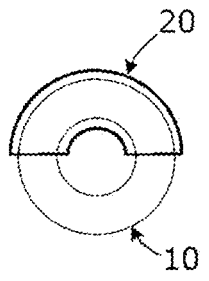
Figure 44M:
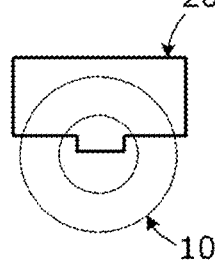
Figure 46A:
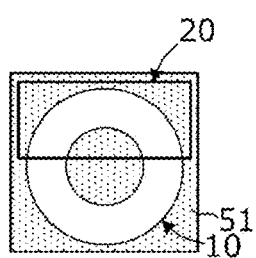
FIGS. 46A to 46F are schematic plan views of antenna devices according to a twentieth preferred embodiment of the present invention.
Figure 46B:
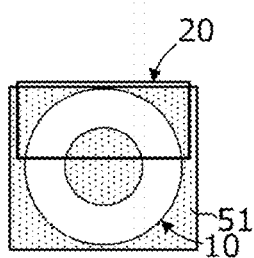
Figure 46C:
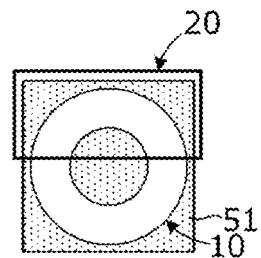
Figure 46D:
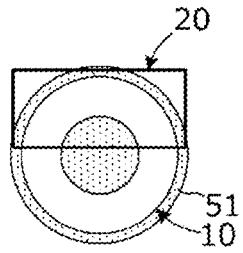
Figure 46E:
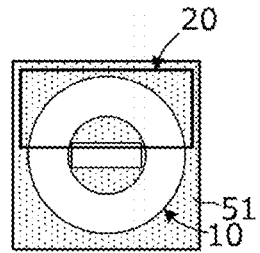
Figure 46F:
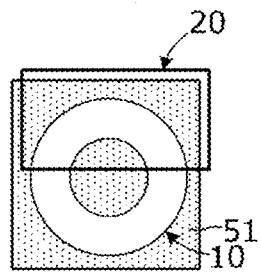
Figure 47A:
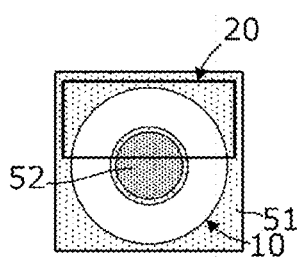
FIGS. 47A to 47H are schematic plan views of other antenna devices according to the twentieth preferred embodiment of the present invention.
Figure 47B:
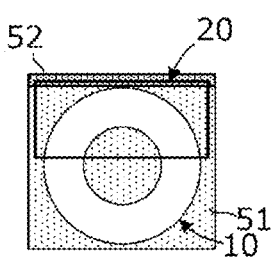
Figure 47C:
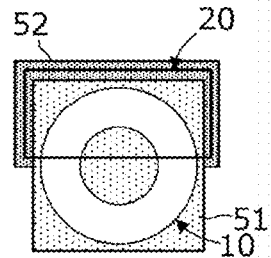
Figure 47D:
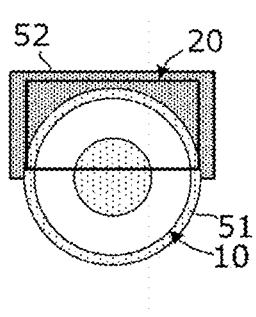
Figure 47E:
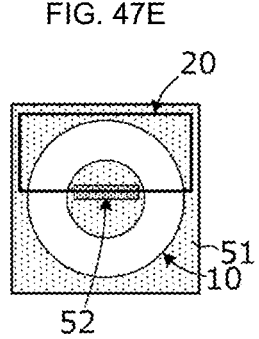
Figure 47F:
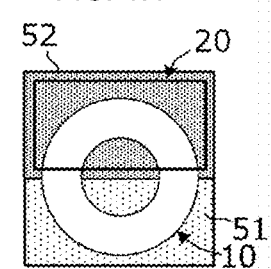
Figure 47G:
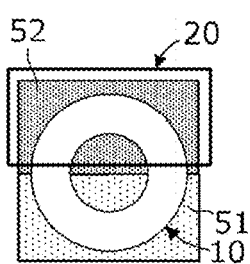
Figure 47H:
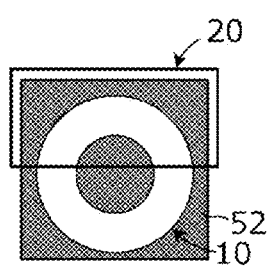
Figure 48A:
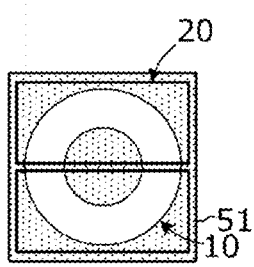
FIGS. 48A to 48G are schematic plan views of other antenna devices according to the twentieth preferred embodiment of the present invention.
Figure 48B:
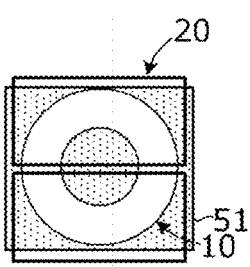
Figure 48C:
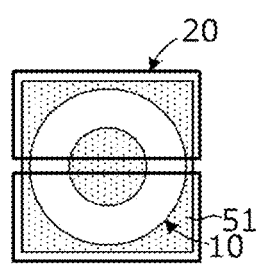
Figure 48D:
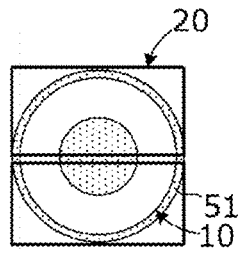
Figure 48E:
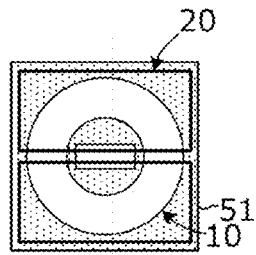
Figure 48F:
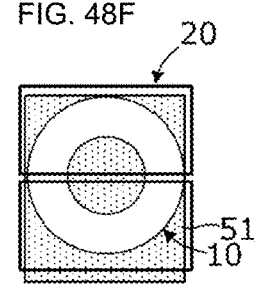
Figure 48G:
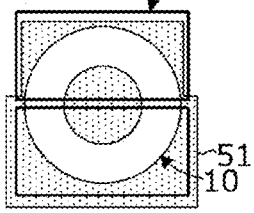
Figure 49A:
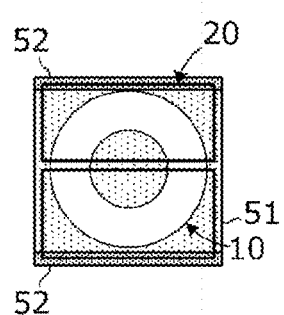
FIGS. 49A to 49G are schematic plan views of other antenna devices according to the twentieth preferred embodiment of the present invention.
Figure 49B:
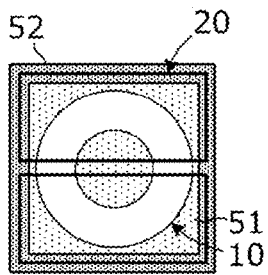
Figure 49C:
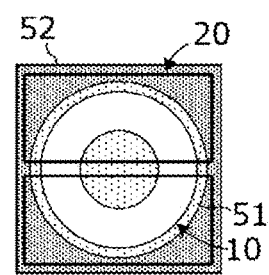
Figure 49D:
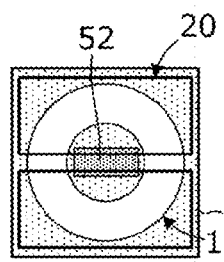
Figure 49E:
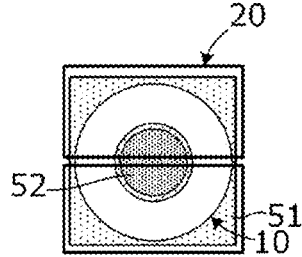
Figure 49F:
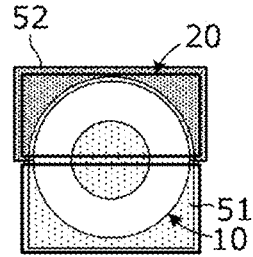
Figure 49G:
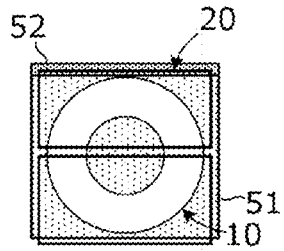

FIGS. 41A to 41C are plan views of antenna devices 117A, 117B, and 117C according to the present preferred embodiment. Each of the antenna devices includes the first coil 10 and the second coil 20. Each second coil 20 has a quadrangular or substantially quadrangular outer shape.

In each of the antenna devices 117A and 117B, intervals between the four sides of the outer shape of the second coil 20 and the first coil 10 are different for the upper and lower sides and for the right and left sides. In the antenna device 117A, the intervals on the upper and lower sides are larger than those on the right and left sides. On the other hand, in the antenna device 117B, the intervals on the right and left sides are larger than those on the upper and lower sides. In the antenna device 117C, the center of the four sides of the outer shape of the second coil 20 is shifted upward relative to the center of the first coil 10.

As in these examples, the intervals between the outer shape of the second coil 20 and the first coil 10 may be different for the upper and lower sides and for the right and left sides. According to the present preferred embodiment, the directivity of the second coil 20 for the short-range wireless communication can also be determined by making the intervals between the outer shape of the second coil 20 and the first coil 10 be different for the upper and for lower sides and the right and left sides.

Although the shape of the second coil 20 is rectangular or substantially rectangular in the example described here, it may be any shape in order to adjust the directivity, inductance, and the like. Similarly, a line width and an arrangement pitch may be any dimensions.

Eighteenth Preferred Embodiment

In an eighteenth preferred embodiment of the present invention, several examples of a shape of a second coil and a positional relationship between a first coil and the second coil will be described.

FIGS. 42A to 42E are schematic plan views of antenna devices according to the eighteenth preferred embodiment. Each of the antenna devices includes the second coil 20 including one main second coil opening and the first coil 10. These drawings illustrate schematic shapes of the first coil 10 and the second coil 20. The basic configurations of the first coil 10 and the second coil 20 are the same as or similar to those described above. The shape of the second coil 20 and the positional relationship between the first coil 10 and the second coil 20 may be as illustrated.

FIGS. 43A to 43J are schematic plan views of other antenna devices according to the eighteenth preferred embodiment. Each of the antenna devices includes the second coil 20 including two main second coil openings and the first coil 10. These drawings illustrate schematic shapes of the first coil 10 and the second coil 20. The basic configurations of the first coil 10 and the second coil 20 are the same as or similar to those described above. The shape of the second coil 20 and the positional relationship between the first coil 10 and the second coil 20 may be as illustrated.

Note that the second coil may be configured by combining the second coils in the plurality of antenna devices described above. Further, the configuration of the second coil may be changed in the upper and lower sides or in the left and right sides.

Nineteenth Preferred Embodiment

In a nineteenth preferred embodiment of the present invention, several examples of a shape of a second coil and a positional relationship between a first coil and the second coil will be described.

FIGS. 44A to 44M are schematic plan views of antenna devices according to the nineteenth preferred embodiment. Each of the antenna devices includes the first coil 10 and the second coil including one main second coil opening. These drawings illustrate schematic shapes of the first coil 10 and the second coil 20. The basic configurations of the first coil 10 and the second coil 20 are the same as or similar to those described above. The shape of the second coil 20 and the positional relationship between the first coil 10 and the second coil 20 may be as illustrated.

FIGS. 45A to 45S are schematic plan views of other antenna devices according to the nineteenth preferred embodiment. Each of the antenna devices includes the first coil 10 and the second coil 20 including one main second coil opening. These drawings illustrate schematic shapes of the first coil 10 and the second coil 20. The basic configurations of the first coil 10 and the second coil 20 are the same as or similar to those described above. The shape of the second coil 20 and the positional relationship between the first coil 10 and the second coil 20 may be as illustrated.

The second coil may be configured by combining the second coils in the plurality of antenna devices described above. Further, configuration of the second coil may be changed in the upper and lower sides or in the left and right sides.

Twentieth Preferred Embodiment

In a twentieth preferred embodiment of the present invention, several examples of a shape of a second coil and a positional relationship between a first coil and the second coil will be described.

FIGS. 46A to 46F are schematic plan views of antenna devices according to the twentieth preferred embodiment. Each of the antenna devices includes a first magnetic body 51, the second coil 20 including one main second coil opening, and the first coil 10. These drawings illustrate schematic shapes of the first coil 10 and the second coil 20. The basic configurations of the first coil 10 and the second coil 20 are the same as or similar to those described above. A shape of the first magnetic body 51 and a positional relationship of the first magnetic body 51 with respect to the first coil 10 and the second coil 20 may be as illustrated.

FIGS. 47A to 47H are schematic plan views of other antenna devices according to the twentieth preferred embodiment. Each of the antenna devices includes the first magnetic body 51, a second magnetic body 52, the second coil 20 including one main second coil opening, and the first coil 10. These drawings illustrate schematic shapes of the first coil 10 and the second coil 20. The basic configurations of the first coil 10 and the second coil 20 are the same as or similar to those described above. Shapes of the first magnetic body 51 and the second magnetic body 52 and positional relations of the first magnetic body 51 and the second magnetic body 52 with respect to the first coil 10 and the second coil 20 may be as illustrated. In addition, the second magnetic body 52 may be positioned so as to overlap with the first magnetic body 51, or the first magnetic body 51 may include an opening in a portion where the second magnetic body 52 is present.

FIGS. 48A to 48G are schematic plan views of other antenna devices according to the twentieth preferred embodiment. Each of the antenna devices includes the first magnetic body 51, the second coil 20 including two main second coil openings, and the first coil 10. These drawings illustrate schematic shapes of the first coil 10 and the second coil 20. The basic configurations of the first coil 10 and the second coil 20 are the same as or similar to those described above. A shape of the first magnetic body 51 and a positional relationship of the first magnetic body 51 with respect to the first coil 10 and the second coil 20 may be as illustrated.

FIGS. 49A to 49G are schematic plan views of other antenna devices according to the twentieth preferred embodiment. Each of the antenna devices includes the first magnetic body 51, the second magnetic body 52, the second coil 20 including two main second coil openings, and the first coil 10. These drawings illustrate schematic shapes of the first coil 10 and the second coil 20. The basic configurations of the first coil 10 and the second coil 20 are the same as or similar to those described above. Shapes of the first magnetic body 51 and the second magnetic body 52 and positional relationships of the first magnetic body 51 and the second magnetic body 52 with respect to the first coil 10 and the second coil 20 may be as illustrated.

Finally, explanation of the above-described preferred embodiments is illustrative and not restrictive in all respects. Variations and modifications can be appropriately made by those skilled in the art. A range of the present invention is indicated not by the above-described preferred embodiments but by the scope of the claims of the present invention. Further, the range of the present invention includes modifications from the preferred embodiments within a range equivalent to the scope of the invention.

For example, in each of the above-described preferred embodiments, although the first coil in which the outline shape has a circular or substantially circular shape is illustrated as an example, the schematic shape of the first coil is not limited thereto and may be, for example, a rectangular or substantially rectangular shape, an elliptical or substantially elliptical shape, a semicircular or substantially semicircular shape, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic apparatus, comprising:
a rectangular or substantially rectangular plate-shaped housing including a first side and a second side which are long sides and a third side and a fourth side which are short sides; and
an antenna device in the housing; wherein
the antenna device includes a first coil including a first coil conductor defining a first coil opening and a second coil including a second coil conductor defining a second coil opening;
a portion of the first coil conductor overlaps with the second coil opening in plan view of the first coil opening;
a portion of the second coil conductor overlaps with the first coil opening in plan view of the first coil opening;
a center of gravity of the housing is located within a formation region of the first coil in plan view of the first coil opening; and
a first center of gravity of the second coil is closer to the third side than a center of gravity of the first coil in plan view of the first coil opening.

2. The electronic apparatus according to claim 1, wherein a straight line connecting a center of gravity of the first coil opening and a center of gravity of the second coil opening intersects with the third side and the fourth side in plan view of the first coil opening.

3. The electronic apparatus according to claim 1, comprising a magnetic body overlapping with the first coil or the second coil in plan view of the first coil opening.

4. The electronic apparatus according to claim 3, wherein the second coil includes a portion is a vicinity of or adjacent to the third side and parallel or substantially parallel to the third side, and the magnetic body is on a communication surface side of the portion.

5. The electronic apparatus according to claim 3, wherein the magnetic body overlaps with the first coil and does not overlap with a portion or an entirety of the second coil in plan view of the first coil opening.

6. The electronic apparatus according to claim 3, comprising a heat dissipation member overlapping with the magnetic body.

7. The electronic apparatus according to claim 1, wherein the first coil conductor includes a plurality of conductor wires connected in parallel with each other and side by side in a spiral shape.

8. The electronic apparatus according to claim 1, comprising:
a single base member; wherein
the first coil includes the first coil conductor on the base member; and
an insulator layer insulating the first coil conductor and the second coil conductor from each other is provided in a portion and in a vicinity of the portion of the second coil overlapping with the first coil in plan view of the first coil opening.

9. The electronic apparatus according to claim 1, wherein the second coil conductor includes a third coil opening; and
the third coil opening does not overlap with the second coil opening in plan view of the first coil opening, and magnetic flux generated in the second coil opening and magnetic flux generated in the third coil opening by a current flowing through the second coil have polarities opposite to each other.

10. The electronic apparatus according to claim 9, wherein a portion of the first coil conductor overlaps with the third coil opening in plan view of the first coil opening.

11. The electronic apparatus according to claim 9, wherein the first coil conductor does not overlap with the third coil opening in plan view of the first coil opening.

12. The electronic apparatus according to claim 9, wherein coupling between the second coil and the first coil is reduced or prevented by coupling between the third coil opening of the second coil and the first coil.

13. The electronic apparatus according to claim 9, wherein an extending direction of a portion of the second coil defining a boundary between the second coil opening and the third coil opening intersects with the first side and the second side in plan view of the first coil opening.

14. The electronic apparatus according to claim 13, wherein a portion of the second coil defining the boundary between the second coil opening and the third coil opening is located at a position closer to the third side than a center of gravity of the first coil opening in plan view of the first coil opening.

15. The electronic apparatus according to claim 9, wherein an area of a portion of the first coil, which overlaps with the second coil opening, and an area of a portion of the first coil, which overlaps with the third coil opening, are different from each other in plan view of the first coil opening.

16. The electronic apparatus according to claim 9, wherein the first coil opening includes a portion that does not overlap with any of the second coil conductor, the second coil opening, and the third coil opening in plan view of the first coil opening.

17. The electronic apparatus according to claim 9, wherein the first coil includes a spiral shape including an outer periphery and an inner periphery; and a crossover conductor connecting an end portion of the outer periphery and an end portion of the inner periphery is provided between the second coil opening and the third coil opening of the second coil.

18. The electronic apparatus according to claim 9, wherein a boundary between the second coil opening and the third coil opening is located closer to the fourth side than a center of gravity of the first coil opening; and the third coil opening is smaller than the second coil opening.

* * * * *